United States Patent [19]

Dresie et al.

[11] Patent Number: 5,553,835
[45] Date of Patent: Sep. 10, 1996

[54] METHOD FOR DRYING SOLVENT BASED FILM

[75] Inventors: Carl F. Dresie, Rochester; Edward S. Jones, E. Rochester; Stephen R. Shelley, Spencerport; Kurt H. Strobl, Webster; Shamal L. Suthar, Pittsford, all of N.Y.; Harold C. Worden, Santee, S.C.

[73] Assignee: Eastman Kodak Company, Rochester, N.Y.

[21] Appl. No.: 418,740

[22] Filed: Apr. 7, 1995

Related U.S. Application Data

[62] Division of Ser. No. 142,271, Oct. 25, 1993.

[51] Int. Cl.$^6$ ............................ B29C 39/42; B29C 41/28
[52] U.S. Cl. ........................ 264/204; 264/207; 264/217; 264/234; 264/345
[58] Field of Search .................................. 264/204, 556, 264/217, 205, 207, 218, 212, 234, 345, 211.11; 425/224, 72.1, 74–75; 34/630–631

[56] References Cited

U.S. PATENT DOCUMENTS

| | | | |
|---|---|---|---|
| 2,232,012 | 2/1941 | Rooney et al. | 264/217 |
| 2,253,157 | 8/1941 | Weingand et al. | 425/75 |
| 2,592,319 | 4/1952 | Nadeau et al. | |
| 2,688,155 | 9/1954 | Nadeau et al. | 425/74 |
| 2,714,745 | 8/1955 | Kenyon. | |
| 2,736,066 | 2/1956 | Chren et al. | 264/211.13 |
| 2,926,104 | 2/1960 | Goetz. | |
| 3,026,571 | 3/1962 | Maier | 425/75 |
| 3,112,528 | 12/1963 | Czerkas. | |
| 4,004,870 | 1/1977 | Guttinger et al. | 425/224 |
| 4,365,423 | 12/1982 | Arter et al. | 34/23 |
| 4,468,280 | 8/1984 | Bender et al. | 156/624 |
| 4,505,053 | 3/1985 | Andersson et al. | 34/631 |
| 4,569,658 | 2/1986 | Wiggins et al. | 432/47 |
| 4,584,231 | 4/1986 | Knoop | 428/20 |
| 4,664,859 | 5/1987 | Knoop | 264/102 |
| 4,704,804 | 11/1987 | Wyatt et al. | 34/15 |
| 5,075,064 | 12/1991 | Kawaratani et al. | 264/205 |
| 5,152,947 | 10/1992 | Takeda et al. | 264/217 |
| 5,188,788 | 2/1993 | Suzuki et al. | 264/217 |
| 5,372,493 | 12/1994 | Rodgers et al. | 425/188 |

FOREIGN PATENT DOCUMENTS

| | | | |
|---|---|---|---|
| 2012138 | 3/1990 | Canada | B29C 41/28 |
| 328227 | 8/1989 | European Pat. Off. | 34/631 |
| 91120511 | 11/1991 | European Pat. Off. | B29C 41/46 |
| 1943216 | 3/1971 | Germany | 425/224 |
| 229074 | 11/1984 | Germany | B29D 7/00 |
| 0229074 | 10/1985 | Germany | 264/217 |
| 261230 | 3/1986 | Germany | G03C 1/76 |
| 270360 | 3/1988 | Germany | F26B 3/02 |
| 58-215318 | 12/1983 | Japan | 264/345 |
| 61100421 | 10/1984 | Japan | B29C 41/12 |
| 87-64514 | 9/1985 | Japan | B29C 41/12 |
| 61-110520 | 5/1986 | Japan | 264/204 |
| 213791/87 | 8/1987 | Japan | B29C 41/12 |
| 64-55214 | 3/1989 | Japan | 264/217 |
| 1199660 | 5/1984 | U.S.S.R. | B29C 71/02 |

Primary Examiner—Jeffery R. Thurlow
Attorney, Agent, or Firm—Clyde E. Bailey, Sr.

[57] ABSTRACT

Solvent based film is produced in an endless belt casting apparatus (10) in which, within initial compartments (46–52), flows of gas are directed through transversely elongated inlet channels ($85_i$) to contact a layer (36') of polymer and solvent supported by an endless belt (26) and flows of gas and solvent vapors are withdrawn from the vicinity of the layer by transversely elongated gas plenums (68); within subsequent compartments (54–62), flows of gas are directed through elongated inlet plenums (74) to contact the layer and flows of gas and solvent vapors are withdrawn through transversely elongated exhaust channels ($85_o$); within all compartments along upper and lower spans of the belt, flows of gas are directed at the inner side (30) of the belt from transversely elongated gas plenums (70) and flows of gas are withdrawn though outlets (72); and within initial compartments (46–52), flows of cooling gas are directed at the edges of the inner side of the belt from cooling nozzles (146,148). Corresponding methods are taught.

14 Claims, 17 Drawing Sheets

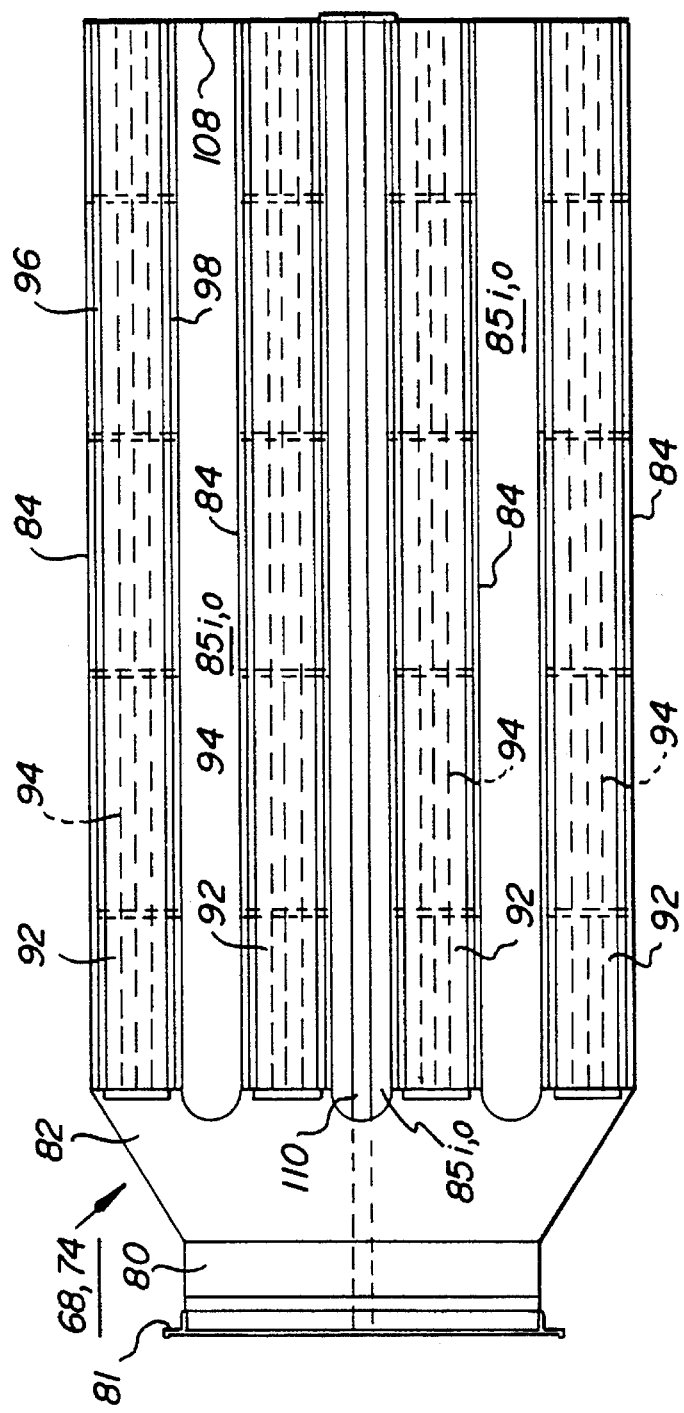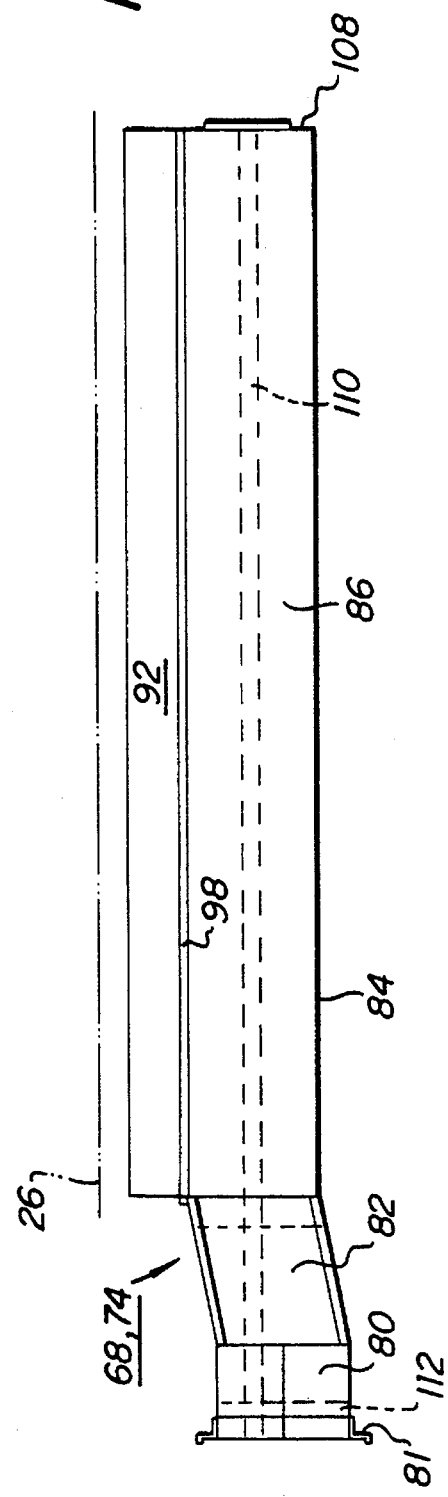

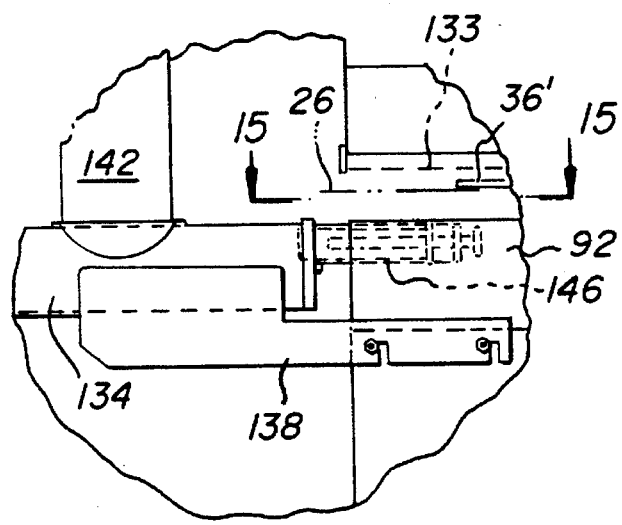
FIG. 13
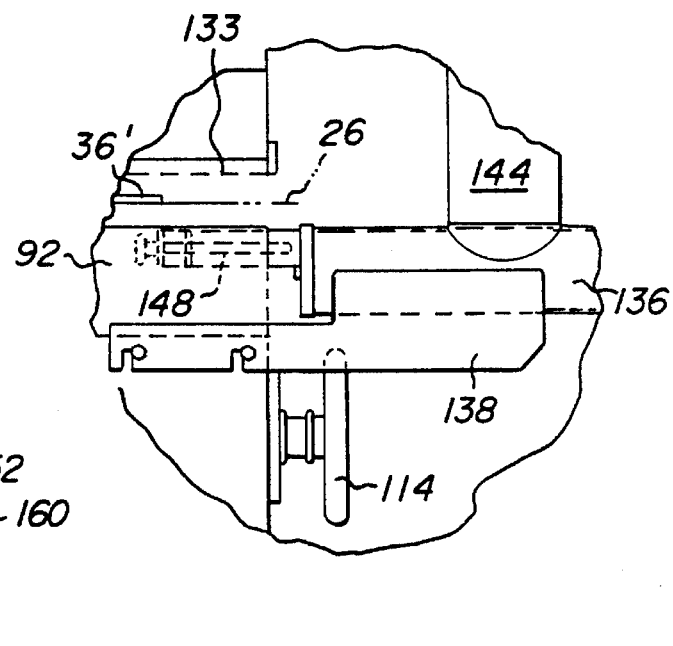
FIG. 14
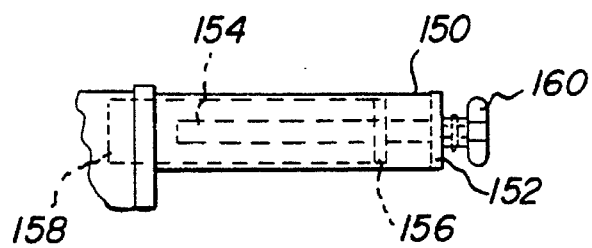
FIG. 15
FIG. 16

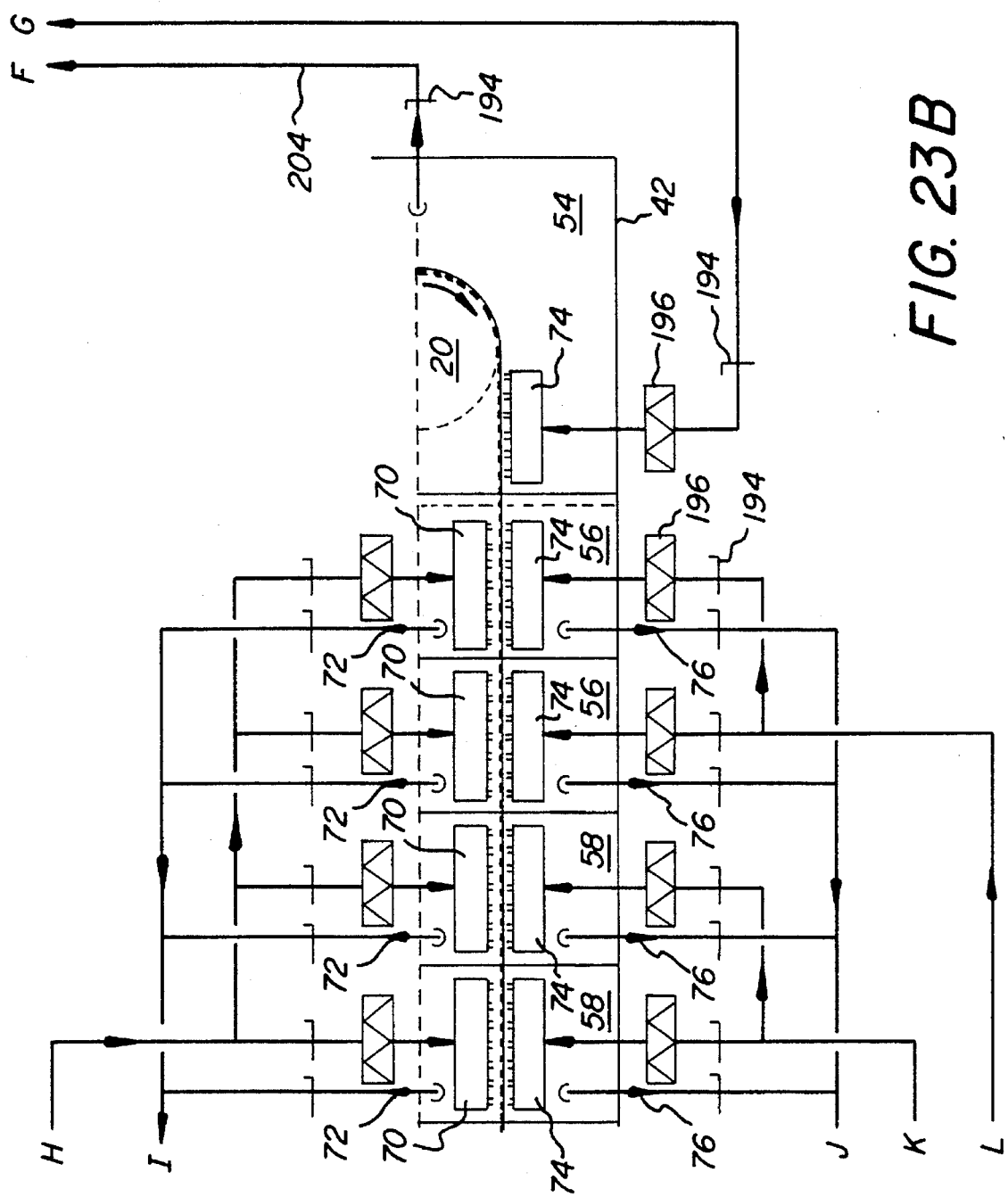

METHOD FOR DRYING SOLVENT BASED FILM

CROSS REFERENCE TO RELATED APPLICATION

This applications is a divisional application is related to U.S. Ser. No. 08/142,271, filed 25 Oct. 1993.

TECHNICAL FIELD

The invention concerns apparatus and methods for making thin films of polymeric material such as cellulose acetate. More particularly, the invention concerns apparatus and methods for drying a solvent based film after the film has been cast onto a cooling member such as an endless belt or band, without causing surface irregularities on the film which could affect its usefulness for certain applications, such as support material for various photographic products.

BACKGROUND ART

Numerous efforts have been made over the years to develop apparatus for making thin films for various applications. For example, U.S. Pat. No. 2,592,319 discloses a casting apparatus for film support or sheeting in which a layer of solvent based dope is cast onto the circumferential surface of a large, rotating drum or wheel. Just downstream of the hopper or die which casts the layer onto the drum, a fine meshed screen is positioned radially outboard of, but parallel to, the layer to prevent dryer gas currents from damaging the surface of the layer until the sufficient solvent has evaporated from the layer to enable the layer to resist such damage. A somewhat related technique is disclosed in U.S. Pat. No. 2,714,745 in which the casting wheel is provided just downstream of the hopper with a cover plate which defines a radially narrow plenum through which ambient gasses and solvent vapors are drawn back toward the hopper. The solvent rich gasses within the plenum prevent the dope leaving the hopper from setting prematurely and forming hardened slugs or strings on the surface of the cast layer. In such prior art drum casting apparatus, the common practice has been to circulate warm gasses over the surfaces of the drum to promote evaporation of the solvent. In some applications, it also is known to preferentially cool the edges of the drum surface not covered by the cast layer, to provide a more uniform temperature profile from the center of the layer to its edges.

In addition to drum or wheel casting apparatus of the types just mentioned, continuous or endless belt casting apparatus has been used. For example, U.S. Pat. No. 4,004,870 discloses a dual belt system in which a layer of solidifying resins is passed between a pair of endless belts, whose opposite sides are cooled by a liquid spray to promote setting of the resins. U.S. Pat. No. 4,584,231 discloses an apparatus for casting solvent based acrylic films, in which the endless belt passes through a series of heating and cooling zones which cause the solvent to evaporate from the film but are said to help prevent the formation of bubbles in the film. Another endless belt caster is disclosed in U.S. Pat. No. 5,075,064, in which flows of gas are directed against or parallel to both surfaces of the belt at a series of locations along the belt.

While apparatus of these types has achieved considerable acceptance over the years, a variety of problems have persisted. The flows of gas directed to the cast layer, particularly just downstream of the hopper, tend to cause surface irregularities such as ripples and similar defects which can render the resultant film useless for many applications, such as photographic products. After the flows of gas have been directed to the cast layer, the gas and evolved solvent vapor must be removed. Often, the evolved vapors and gas from the center of the cast layer pass over adjacent portions of the layer; so that, different parts of the layer are exposed to gasses having different concentrations of solvent vapor, which leads to non-uniform drying of the layer that can cause undesirable widthwise variations in the properties of the resultant film. As the solvent evaporates from the cast layer, the endless belt supporting the layer is cooled. Since the belt typically is significantly wider than the cast layer, the edges of the belt are not subjected to this evaporative cooling. As a result, the edges of the cast layer experience different drying conditions than the remainder of the layer, a situation which has been found to cause the edges of the layer to curl toward the longitudinal centerline of the cast layer after removal from the casting belt. This cud can make the web hard to convey through subsequent portions of the manufacturing equipment. The tendency toward edge curling can be reduced somewhat by reducing the operating speed of the belt, which tends to reduce manufacturing efficiency. Thus, while known belt casting apparatus is used rather widely, various problems tend to interfere with production of very high quality films such as are needed for photographic applications.

SUMMARY OF THE INVENTION

The apparatus of the invention is especially useful for producing a thin polymeric film and is of the type including a source of a solution of polymer and solvent; an endless casting belt having an outer surface for receiving a cast layer of polymer and solvent and an opposite, inner surface for engaging rollers which drive and support the belt; a casting die for casting the layer of polymer and solvent onto the outer surface, the layer having a transverse width; means for moving the casting belt past the means for casting; and means for directing a flow of dryer gas to the layer to remove solvent and for removing gas and solvent from the vicinity of the casting belt. Although the apparatus and method of the invention are particularly suited for use with a solvent based dope comprising cellulose acetate and methylene chloride, such as the dopes described in commonly assigned U.S. Pat. No. 3,112,528, those skilled in the art will appreciate that the invention also may be used to process a considerable variety of solvent based dopes, such as those comprising polycarbonate and methylene chloride, for example. Similarly, although the invention is particularly suited for use of air as the dryer gas, other gasses or mixtures of gasses such as nitrogen, carbon dioxide and the like may be used without departing from the scope of the invention. The gas as introduced into the apparatus or method also may include a minor percentage of solvent vapor, such as might remain after solvent removal prior to recirculation of the gas.

The improvement according to the invention concerns the means for directing gas and removing gas and solvent. In particular, the improved apparatus comprises plurality of first, elongated gas plenums, each of which extends substantially across the width of the belt downstream of the casting die. Each first plenum comprises openings for directing flows of gas toward the outer surface of the casting belt to remove solvent; evaporating from the layer of polymer and solvent. The first plenums are spaced from each other along at least a first portion of the length of the outer surface of the casting belt. For uniform, ready removal of gas and solvent, at least one exhaust channel is extended substantially across the width of the belt between the first plenums for receiving flows of gas and solvent and directing the gas and solvent away from the layer. Preferably, the flows of gas from the first plenums are directed along flow paths substantially normal to the outer surface of the casting belt and the flows of gas and solvent are removed along flow paths also substantially normal to the outer surface of the casting belt. This arrangement of the first plenums and exhaust channels is believed to minimize flow of dryer gas transversely to the direction of movement of the casting belt and thereby provide more uniform drying conditions across the width of the cast layer.

On the other side of the casting belt from the first plenums, a plurality of second, elongated gas plenums preferably is provided, each second plenum being extended substantially across the width of the belt downstream of the casting die. Each second plenum comprises openings for directing flows of gas toward the inner surface of the casting belt to control the temperature of the casting belt, the second plenums being spaced from each other along at least a portion of the length of the inner surface. For uniform, ready removal of gas from the inner surface of the casting belt, at least one exhaust channel is extended substantially across the width of the belt between the second plenums for receiving flows of gas and directing the gas away from the inner surface. Preferably, the flows of gas toward and away from the inner surface are along flow paths substantially normal to the inner surface of the casting belt.

Preferably, the casting belt is positioned within a gastight casing which is divided transversely to the casting belt into compartments or zones along the length of the casting belt, to facilitate control of the gas flows along the length of the belt as needed for proper drying. Since the layer of polymer and solvent is particularly soft or "green" shortly after being cast onto the belt, means preferably are provided for introducing a flow of gas into at least one first compartment downstream of the casting die but upstream of the first portion of the length of the outer surface where the previously mentioned first plenums are located. Within this first compartment, a plurality of third, elongated gas plenums are located, each third plenum being extended substantially across the width of the casting belt between the means for introducing and the casting belt. Each third plenum comprises openings for receiving flows of gas and solvent and directing the gas and solvent away from the layer into the third plenum. Between the third plenums, at least one inlet channel is extended substantially across the width of the belt for directing flows of gas from the means for introducing toward the outer surface of the casting belt to remove solvent evaporating from the layer. To further minimize any damaging effects of gas flow against the layer and to provide a solvent rich environment above the layer, a screen may be provided between (i) the third plenums and the inlet channel and (ii) the cast layer. In the illustrated embodiment of the invention, the third plenums and inlet channels are provided along essentially the entire length of the upper span of the casting belt. Thus, within such a first compartment, the flows of gas toward and away from the outer surface of the casting belt are reversed from those of the first plenums and exhaust channels; so that, close to the casting die, the layer of polymer and solvent is subjected to especially gentle flow. Preferably, the flows of gas toward and away from the outer surface within such a first compartment also are along flow paths substantially normal to the outer surface of the casting belt.

The first, second and third elongated gas plenums are fabricated in an advantageous, modular fashion. Each plenum comprises an elongated conduit having a side wall with an elongated opening facing the casting belt. An elongated nozzle box or flow guide is positioned to close the elongated opening and is provided with the openings to direct flows of gas from or into the flow guide, as the case may be. On either side of the elongated opening, guide tracks are provided which mate with flanges on the flow guide for sliding engagement which facilitates installation and removal of the flow guides. The first, second and third plenums are connected as respective groups to common inlet ducts and distribution chambers; and each entire assembly of plenums, ducts and chambers is mounted on tracks supported by the frame of the apparatus transverse to the casting belt, to permit ready installation and removal of the assembly through access doors in the casing of the apparatus. Alternatively, the individual plenums may be mottoted for individual removal.

In another embodiment of the invention, the width of the layer of polymer and solvent is less than the width of the casting belt, so that edge bands of the outer surface of the casting belt are exposed on either side of the layer. The means for directing a flow of gas and removing gas and solvent includes a plurality of elongated gas plenums extended substantially across the transverse width of the casting belt, each plenum comprising openings for directing flows of gas toward the inner surface of the casting belt, the plenums being spaced from each other along at least a portion of the length of the inner surface. Between the plenums, at least one exhaust channel extends substantially across the transverse width of the casting belt for receiving flows of gas and directing the gas away from the inner surface. Means are provided, preferably but not necessarily positioned in the exhaust channels, for directing further flows of gas toward the longitudinal edges of the inner surface opposite the exposed bands on the outer surface to cool further the longitudinal edges and reduce the tendency of the layer to edge curl upon removal from the casting belt. These means preferably comprise an array of nozzles extended transversely to the casting-belt and faced toward the longitudinal edges of the inner surface opposite the exposed bands on the outer surface, plus means for selectively opening or closing portions of the arrays to accommodate changes in the transverse width of the layer of polymer and solvent.

The method of the invention is of the type including steps of providing a source of a solution of polymer and solvent; providing an endless casting belt having an outer surface for receiving a cast layer of polymer and solvent and an opposite, inner surface for engaging rolls which drive and support the belt; advancing the endless belt while casting the layer of polymer and solvent onto the outer surface at a location along the casting belt, the layer having a transverse width; directing a flow of dryer gas to the layer to evaporate solvent; and removing gas and solvent from the vicinity of the casting belt. In accordance with the improvement of the invention, at first locations extended substantially across the width of the belt downstream of the location along the casting belt, flows of gas are directed toward the outer surface of the casting belt to remove solvent evaporating from the layer of polymer and solvent, the first locations being spaced from each other along at least a first portion of the length of the outer surface. At least at one second location extended substantially across the width of the belt between the first locations, flows of gas and solvent are received from the layer and directed away from the layer. Preferably, the flows toward and away from the layer are directed along flow paths substantially normal to the outer surface of the casting belt. At third locations extended substantially across the width of the belt downstream of the location on the casting belt, flows of gas preferably are directed toward the inner surface of the casting belt to control the temperature of the casting belt, the third locations being spaced from each other along at least a portion of the length of the inner surface; and at least at one fourth location extended substantially across the width of the belt between the third locations, flows of gas preferably are received and directed away from the inner surface. Preferably, the flows toward and away from the inner surface also are directed along flow paths substantially normal to the inner surface of the casting belt.

Preferably, the casting belt is positioned within a casing divided into compartments along the length of the casting belt, with portions of the first and second locations disposed in successive ones of such compartments. A flow of gas is introduced into at least one first such compartment downstream of the casting location along the casting belt but upstream of the first portion of the length of the outer surface. At fifth locations extended substantially across the width of the casting belt within the at least one compartment and between the point of introduction of the flow of gas and the casting belt, flows of gas and solvent are received and directed away from the layer; and at least at one sixth location extended substantially across the width of the belt between the fifth locations, the flow of introduced gas is directed toward the outer surface of the casting belt to remove solvent evaporating from the layer. Preferably, the flows toward and away from the outer surface also are directed along flow paths substantially normal to the outer surface of the casting belt. Additional flows of gas may be directed to the edges of the inner side of the casting belt to provide additional cooling and reduce the tendency of the layer to edge curl upon removal from the casting belt.

Numerous advantages are achievable using the apparatus and method of the invention. Due to the control of air flow toward and away from the cast layer, more uniform widthwise characteristics, such as surface condition, can be produced in the resulting web of material, than with known apparatus and methods. Use of a screen between (i) the gas inlet plenums and the outlet channels and (ii) the cast layer also tends to improve surface characteristics. Edge curl of the web after removal from the casting belt can reduced. The gas inlet and outlet plenums and their associated nozzle boxes or flow guides are readily removed and replaced to facilitate changes in nozzles and maintenance. Because of the efficient drying of the cast layer, higher operating speeds are practical.

BRIEF DESCRIPTION OF THE DRAWINGS

FIG. 4 shows an elevation view of an assembly of gas plenums for the outer side of the casting belt according to the invention.

FIG. 5 shows a top view of the assembly of FIG. 4.

FIG. 13 shows an enlarged fragmentary view taken on the left side of FIG. 11.

FIG. 14 shows an enlarged fragmentary view taken on the right side of FIG. 11.

FIG. 15 shows a top view of an edge cooling nozzle according to the invention.

FIG. 16 shows an elevation view of the nozzle of FIG. 15.

FIGS. 23A and 23B together show a schematic diagram of the gas and solvent flow control system for the lower span of the casting belt of the apparatus.

DESCRIPTION OF THE PREFERRED EMBODIMENTS

Figure 1:
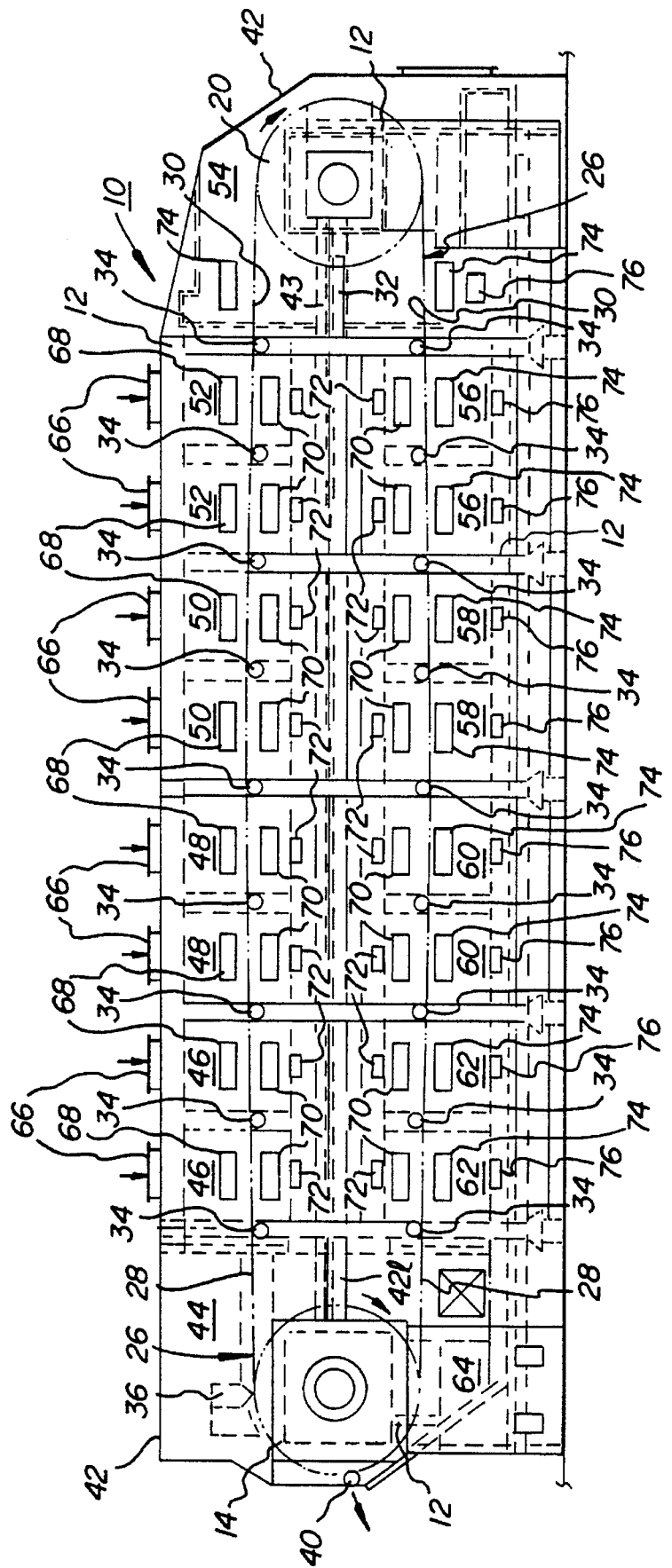
FIG. 1 shows a front elevation view, partially in phantom lines, of a belt casting apparatus according to the invention.

The following is a detailed description of the preferred embodiments of the invention, reference being made to the drawings in which the same reference numerals identify the same elements of structure in each of the several Figures.

Figure 2:
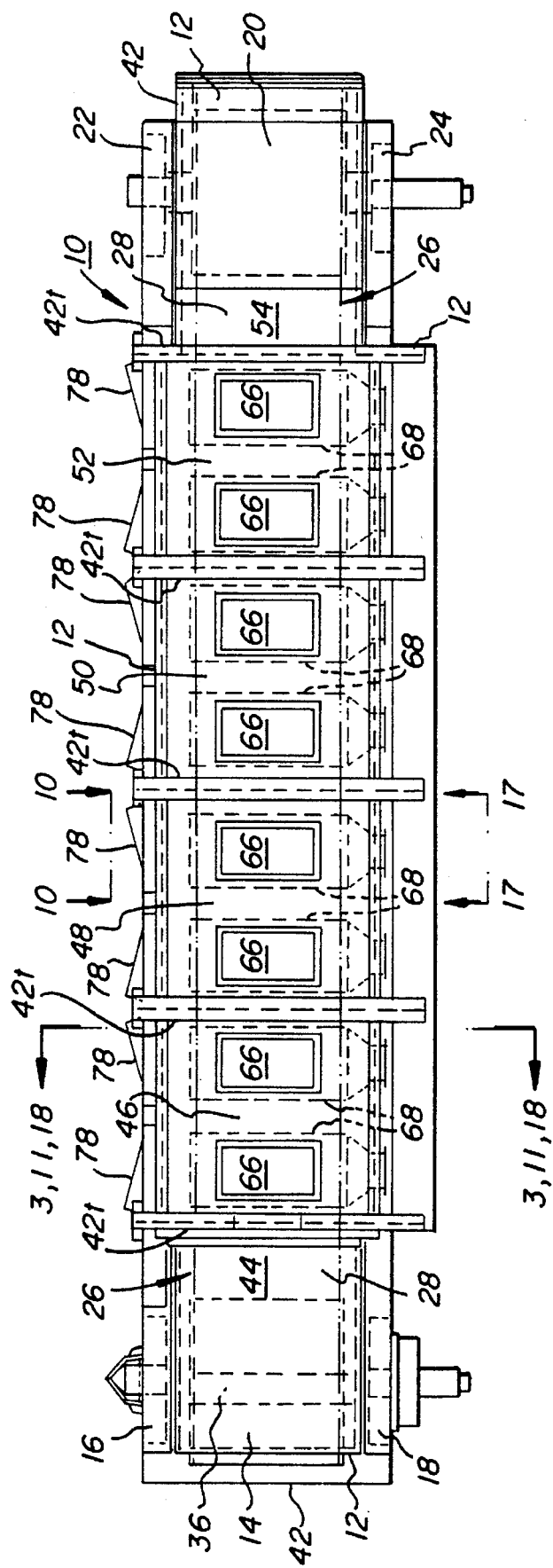
FIG. 2 shows a top view of the apparatus of FIG. 1.
Figure 3:
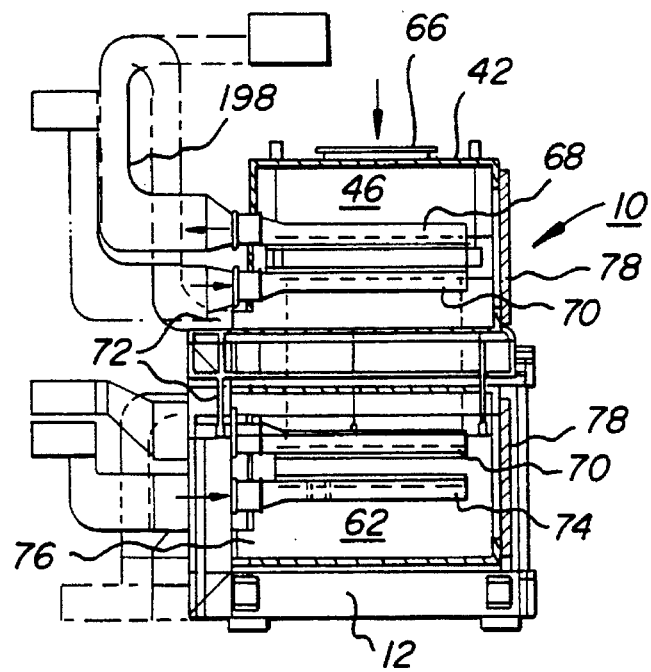
FIG. 3 shows a sectional elevation view taken along line 3—3 of FIG. 2.
Figure 7:
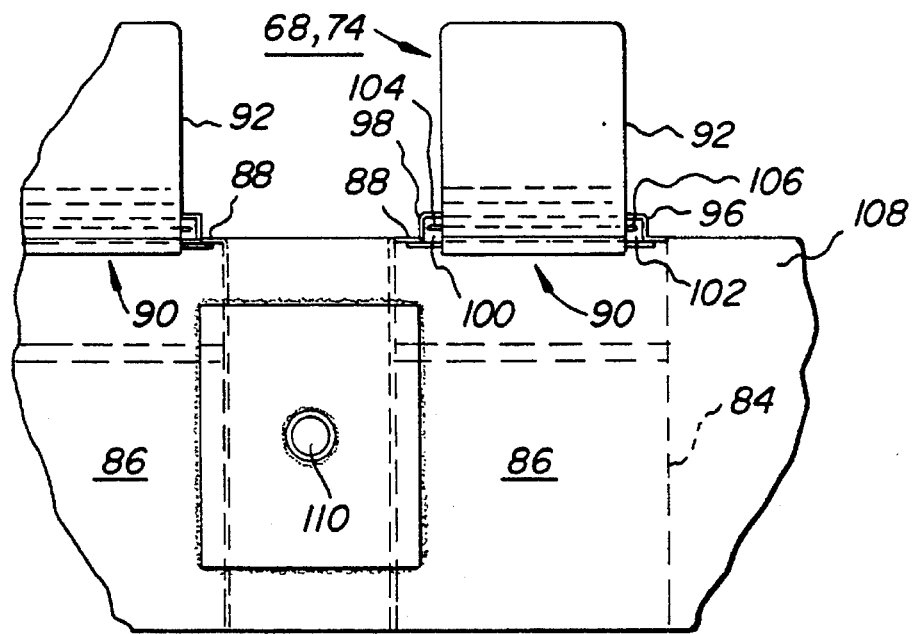
FIG. 7 shows an enlarged fragmentary view of a portion of FIG. 6.
Figure 6:
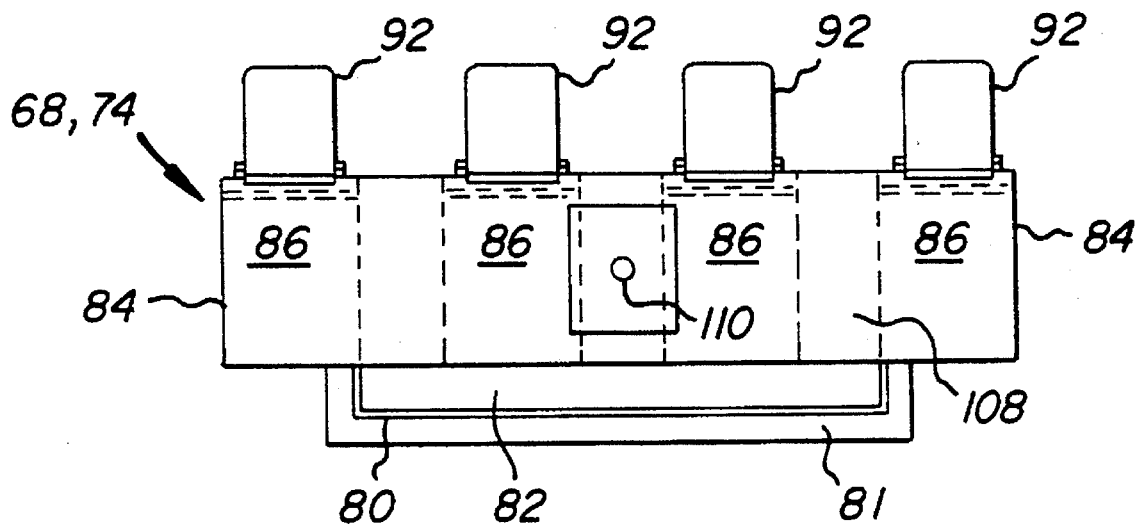
FIG. 6 shows an end view as seen from the right in FIG. 4.
Figure 8:
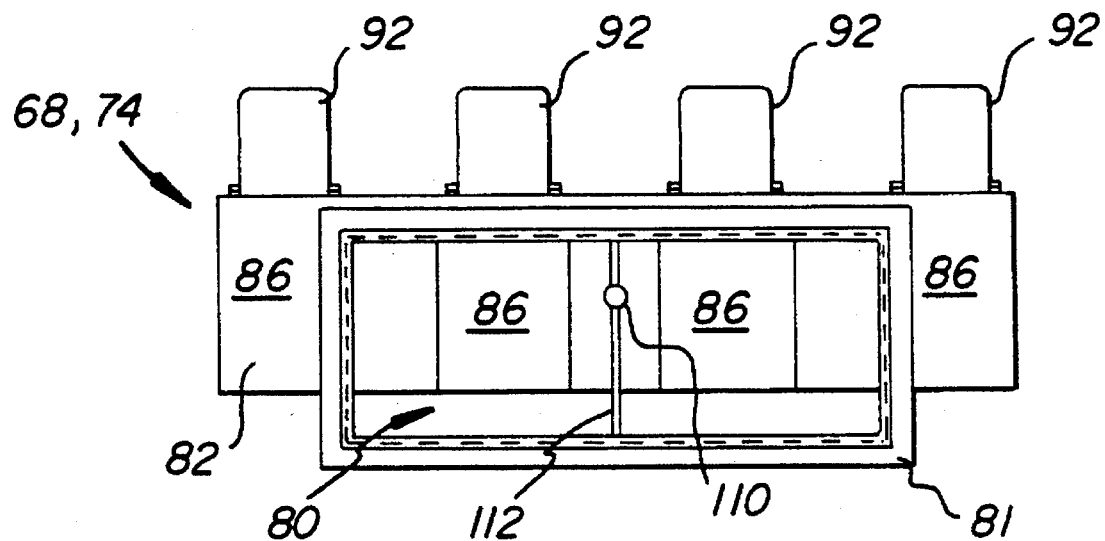
FIG. 8 shows an end view as seen from the left in FIG. 4.

As shown in FIGS. 1 to 3, the invention concerns improvements to an apparatus for casting and drying a thin film of polymeric material, such as cellulose acetate. A robust, elongated space frame 12 supports the various components of the apparatus, including a drive pulley or roll 14, which may be 6 to 8 feet (1.83 to 2.44 meters) in diameter and 6 to 7 feet (1.83 to 2.13 meters) in axial length or width. Roll 14 is supported on frame 12 by suitable bearings 16, 18 and driven in operation by an electric motor, not illustrated. In the conventional manner, roll 14 may be cooled to control the rate of evaporation of solvent when a layer of polymer and solvent is initially cast. At the opposite end of the apparatus, a guide pulley or roll 20 of the same size is supported on frame 12 by suitable bearings 22, 24 which in the conventional manner are track mounted to permit adjustment of the tension in an endless casting belt or band 26 which is wrapped around rolls 14, 20. Also in the conventional manner, roll 20 may be heated to increase the rate of evolution of solvent from the cast layer. Belt 26 may be made of stainless steel, for example, and in a typical application may have a length of 60 to 300 feet (18.29 to 91.44 meters) and a width approximately 2 to 6 inches (50.8 to 152.4 mm) less than the width of rolls 14, 20. The outer surface 28 of belt 26 is highly polished to provide a good finish on the film to be cast onto the belt, while the inner surface 30 of belt engages rolls 14, 20. A conventional tensioning means 32, illustrated only schematically in FIG. 1, is used to move roll 20 as necessary to apply tension to belt 26. A plurality of guide rollers 34, of much smaller diameter but of essentially the same width as rolls 14, 20 are supported on suitable bearings by frame 12 to support belt 26 between the rolls. To ensure that belt 26 makes good contact with each roller 34, the rollers are positioned in the conventional manner as seen in FIG. 1 so that the upper span of belt 26 arches upward and the lower span arches downward.

Above roll 14, a casting hopper or die 36 is located to extrude a layer 36' of polymer and solvent (See FIG. 11) onto outer surface 28 in the conventional manner, the transverse width of layer 36' in the apparatus of the present invention typically being in the range of 12 to 16 inches (305 to 406 ram) less than the width of belt 26. A dope of polymer and solvent, such as cellulose acetate and methylene chloride, is provided to die 36 from a suitable source 38 as shown schematically in FIG. 21. Other dope formulations also may be used in accordance with the invention, as mentioned previously. The layer 36' moves with belt 26 along its upper span, passes around roll 20, moves with belt 26 along its lower span and, having been dried sufficiently in accordance with the invention, is removed from the apparatus over a stripping roller 40 located near roll 14 just upstream of die 36.

The components thus far described are enclosed within a thermally insulated, essentially hermetically sealed casing 42 which is supported by frame 12. Casing 42 is divided into a plurality of compartments along the length of belt 26. The walls of the compartments are deemed by an interior wall 42₁ which extends longitudinally from near roll 14 to near roll 20 between the upper and lower spans of belt 26 and by a plurality of transversely extending interior walls 42ₜ. Suitable slots are provided through walls 42ₜ for passage of belt 26. Thus, casing 42 encloses a dope hopper compartment 44 for die 36, and downstream thereof first through ninth dryer compartments or zones 46 to 62 and a final stripper compartment or zone 64. The compartments 46 to 52 and 56 to 62 may be from 8 to 10 feet (2.44 to 3.05 meters) in length measured along belt 26. Within each compartment, in the manner to be described, controlled flows of gas are directed toward the inner and outer surfaces of belt 26 to remove solvent vapors as they evolve from the layer 36' during its movement through the apparatus.

Because layer 36' as it leaves hopper compartment 44 still contains a substantial amount of solvent, its surface is rather soft and delicate or "green" and can rather easily be damaged by gas flow in the dryer compartments. In addition, too rapid a rate of drying can cause the surface of layer 36' to form a skin of dried material before enough solvent has evolved from the layer, leading to the formation of surface irregularities and retardation of subsequent drying of the layer. To minimize such damage and to provide an appropriate rate of drying in accordance with the invention, at least compartment 46 is provided with unique features for controlling the application of gas to the surface of layer 36' and removal of gas and solvent vapors. In the illustrated embodiment, such features are also provided in dryer compartments 48 to 52 to provide added assurance against damage to layer 36'. At locations opposite outer surface 28, casing 42 is provided with gas inlets 66 into compartments 46 to 52. Inlets 66 extend substantially across the width of layer 36' for introducing a flow of gas into each compartment. Between inlets 66 and surface 28 in compartments 46 to 52 are located a plurality of elongated gas plenums 68. Each plenum 68 is extended substantially across the width of belt 26 and, as discussed in more detail regarding FIGS. 4 to 8, comprises openings for receiving flows of gas and solvent and directing the gas and solvent away from the surface of layer 36'. Gas from inlets 66 flows through inlet channels between the elongated plenums, as will be discussed with regard to FIGS. 4 to 8.

At locations opposite inner surface 30 in compartments 46 to 52 and 56 to 62 are located a plurality of elongated gas plenums 70. Each plenum 70 is extended substantially across the width of belt 26 and, as discussed with regard to FIG. 9, comprises openings for directing flows of gas toward belt 26 to heat or cool the belt, the plenums 70 being spaced from each other along at least a portion of the length of inner surface 30, as illustrated. Gas from plenums 70, after contacting inner surface 30, passes through exhaust channels between the plenums 70 and then is exhausted from casing 42 through outlets 72 in each compartment.

Figure 22A:
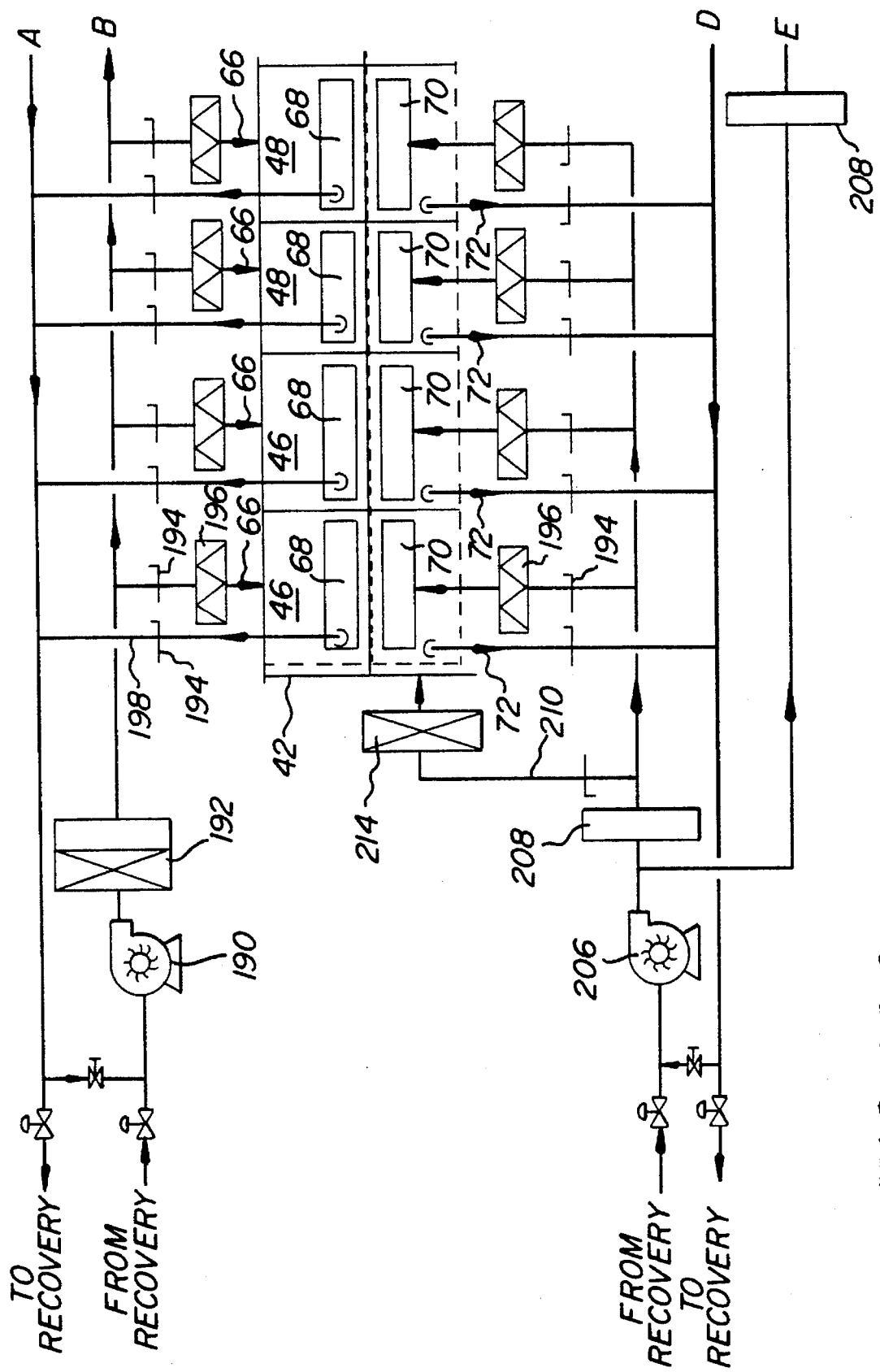
FIGS. 22A and 22B together show a schematic diagram of the gas and solvent flow control system for the upper span of the casting belt of the apparatus.
Figure 22B:
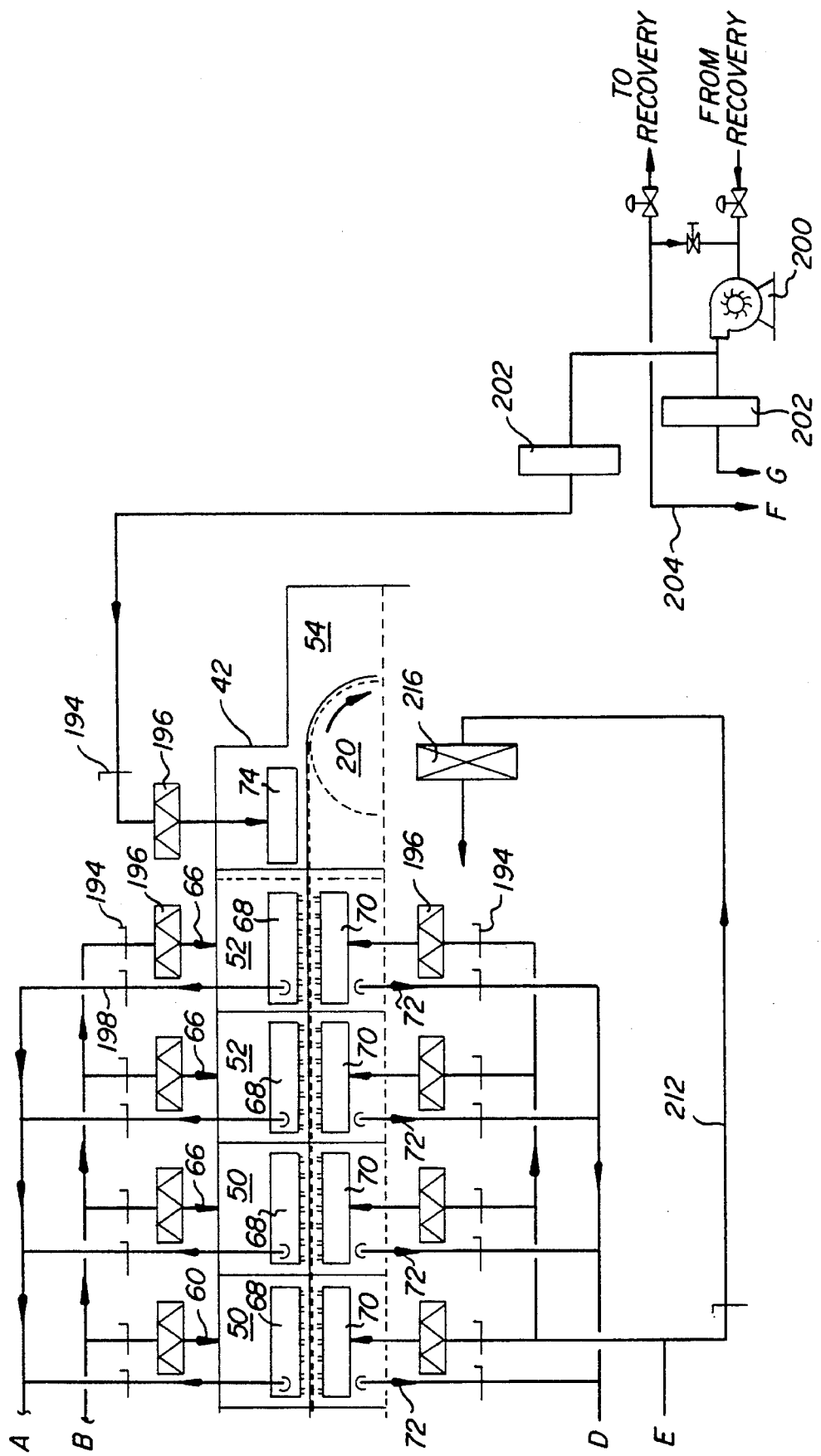
Figure 23A:
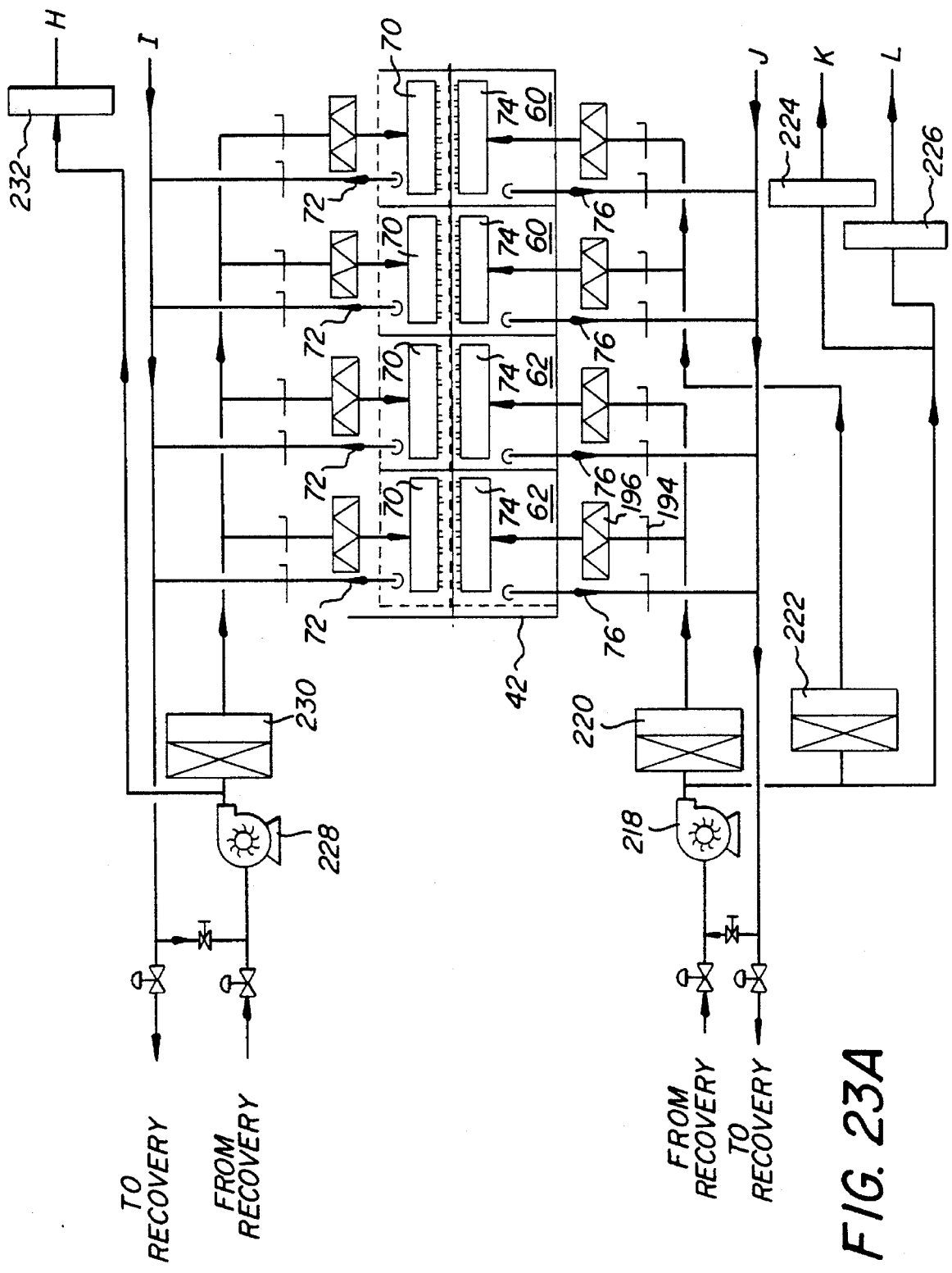

Compartments 54 to 62 are provided with a plurality of elongated gas plenums 74, which may be identical in structure to plenums 68. However, by the tinge layer 36' reaches these compartments, it has dried sufficiently to be subjected to more vigorous gas flows. So, plenums 74 are used to direct flows of gas toward layer 36' on outer surface 28 to remove solvent vapor evolving from layer 36'. As seen in FIGS. 1, 22B and 23B, compartment 54 is provided with two plenums 74, one for the final portion of the upper span of belt 26 and one for the initial portion of the lower span; however, due to space limitations, no plenums 70 are provided in compartment 54. Gas and solvent vapors are exhausted from end compartment 54 through a single outlet 76 in the lower portion of compartment 54; and from compartments 56 to 62, through outlets 76 in each compartment. Further details on gas flow to and from the various compartments are described subsequently with regard to FIGS. 21 to 23. Access to each compartment is provided by means such as doors 78, shown partially open in FIG. 2.

As illustrated in FIGS. 4 to 8, elongated gas plenums 68, 74 are stainless steel fabrications or assemblies comprising a rectangular inlet duct 80 having a seal flange 81 which mates with casing 42 in a manner to be described. Duct 80 opens into a distribution or expansion chamber 82 which communicates with a plurality of elongated, essentially parallel gas ducts 84 having lengths substantially equal to the width of belt 26. For an apparatus of the overall size previously discussed, each fabricated gas plenum 68, 74 has a width parallel to the direction of movement of belt 26 in the range of 2.5 to 3.5 feet (0.76 to 1.07 meters). Between ducts 84 are inlet channels 85ᵢ (in the case of plenums 68) or exhaust channels 85ₒ (in the case of plenums 74) through which gas or gas and solvent vapors, respectively, pass to and from engagement with layer 36'. Channels 85ᵢ, 85ₒ may have a width in the direction of movement of belt 26 in the range of 5 to 7 inches (127 to 178 mm). Each duct 84 is defined by a rectangular conduit 86 having a side wall 88 with an elongated opening 90 which faces toward belt 26 when plenums 68, 74 are installed in apparatus 10. Opening 90 is closed by an elongated flow guide or nozzle box 92 which is provided with rows of openings 94 for receiving flows of gas and solvent from layer 36' (in the case of plenums 68) or for directing flows of gas toward layer 36' (in the case of plenums 74).

In one actual embodiment of the invention, openings 94 on each flow guide 92 were provided in three rows approximately 71 inches (1.80 m) long, the twelve rows being formed of staggered slots about 0.125 inch (3.12 mm) wide, arranged to give an equivalent of eight full length slots. At a gas flow rate of 1000 ft/min (28 m/min) at 70° F. (21.1° C.) and 0.4 to 0.7 inch (10.2 to 17.8 mm) water column pressure, a calculated flow velocity of about 2,000 ft/min (609.6 m/min) would be achieved at openings 94, whether into plenums 68 or out of plenums 74. Nozzle velocities in the range of 1,000 to 3,000 ft/min (304.8 to 914.4 m/min) are suitable at openings 94. On the other hand, the same gas flow rate through three inlet channels $85_i$ or outlet channels $85_o$, each having a width of about 6 inches (152.4 mm) and a length of about 72 inches (1.83 m) would produce a calculated flow velocity of 111 ft/min (33.8 m/min). Flow velocities in the range of 50 to 300 ft/min (15.2 to 91.4 mn/min) are suitable at midchannel in channels $85_i$ and $85_o$. So, in compartments 46 to 52, layer 36' would be subjected to a gentle flow rate issuing from inlet channels $85_i$ and leaving through openings 94; while in compartments 54 to 62, layer 36' would be subjected to a more vigorous flow rate issuing from openings 94 and exiting through exhaust channels $85_o$.

A pair of guide tracks 96, 98 are provided on either side of opening 90, the tracks being defined by slotted bars 100, 102 of Teflon, Nylon or a similar lubricious material, which engages flanges 104, 106 on the sides of flow guides 92. Thus, each flow guide can be readily installed in or removed from its duct 84, as may be required for cleaning or other maintenance, for example. Slotted bars 100, 102 also act as seals between each duct 84 and its associated flow guide. An end plate 108 is secured to the ends of ducts 84 opposite to chamber 82 and a centrally located tube 110 is rigidly attached between end plate 108 and a strut 112 mounted within inlet duct 80. To help secure plenums 68, 74 within the apparatus, a long screw, not illustrated, is passed through tube 110 to engage a suitable threaded fastener, not illustrated, on frame 12 or casing 42. The screw may be rotated and secured by a conventional handwheel 114, as indicated in FIGS. 10 to 12.

Figure 9:
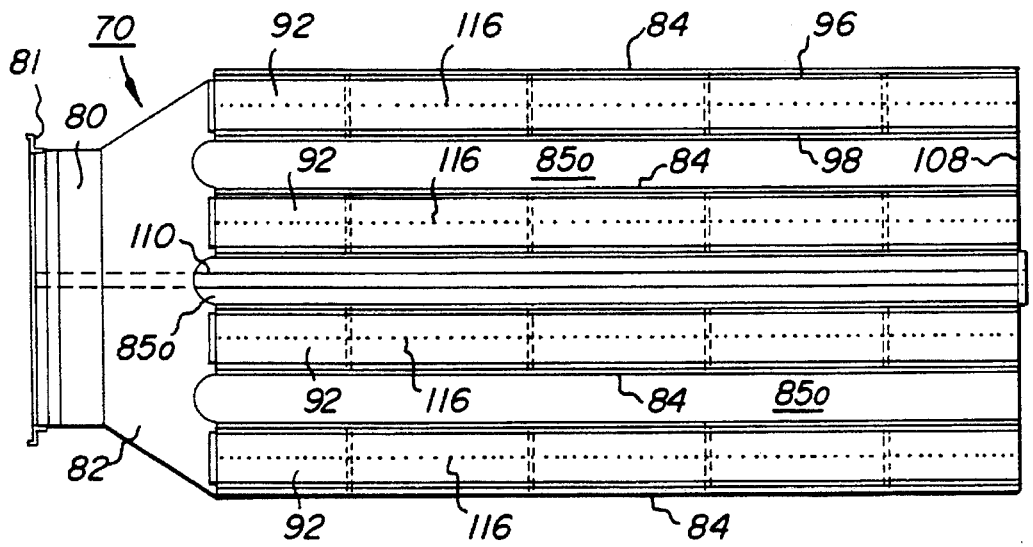
FIG. 9 shows a top view of an assembly of gas plenums for the inner side of the casting belt according to the invention.

Each of elongated plenums 70 is essentially identical to plenums 68, 74, except that the rows of openings 94 are replaced by a single row of openings 116 in each flow guide 92, as shown in FIG. 9. In one actual embodiment of the invention, openings 116 were 0.3125 inch (7.94 mm) in diameter, spaced 0.5 inch (12.7 mm) apart along the length of each flow guide with 10.75 inch (273 mm) between adjacent rows. At the same gas flow rate and temperature previously used for plenums 68 and 74 and at 1.05 to 1.8 inches (26.7 to 45.7 mm) water column pressure, a calculated flow velocity of 3,260 ft/min (993.6 m/min) would be achieved at openings 116, thereby subjecting the inner side of the belt to a still more vigorous flow rate. Nozzle velocities in the range of 2,000 to 5,000 ft/min (609.6 to 1524 m/min) are suitable at openings 116.

As shown in FIGS. 10 to 17, mounting of plenums 68, 70, 74 along the upper span of belt 26 within apparatus 10 is facilitated by pairs of tracks 118, 120 and 126, 128 mounted to frame 12 on opposite sides of belt 26. Roller sets 122, 124 and 130, 132 are mounted to the sides of plenums 68, 70, 74; so that, each plenum may be easily rolled along its associated tracks into position adjacent belt 26 and then secured in place using hand wheel 114 and its associated screw. Alternatively, guide tracks with slotted bars of lubricious material and flanges on the plenums, similar to those used for flow guides 92, could be used to mount plenums 68, 70, 74. Those skilled in the an will appreciate, moreover, that the individual ducts 84 could be mounted and ducted individually, rather than grouped as plenums in the manner illustrated, without departing from the scope of the present invention. When plenums 68, 74 are installed in compartments 46 to 54 along the upper span of belt 26, the surfaces of flow guides 92 facing belt 26 preferably are spaced from the belt by a distance in the range of 1 to 3 inches (25.4 to 76.2 mm) to facilitate gentle engagement of gas with layer 36'. But, for plenums 70 in all compartments and for plenums 74 in compartment 54 and along the lower span of belt 26, flow guides 92 preferably are spaced from the belt by a distance in the range of 0.5 to 1.5 inch (12.7 to 38.1 mm), to provide more vigorous engagement with the inner side of belt 26 and with partially dried layer 36'.

Figure 10:
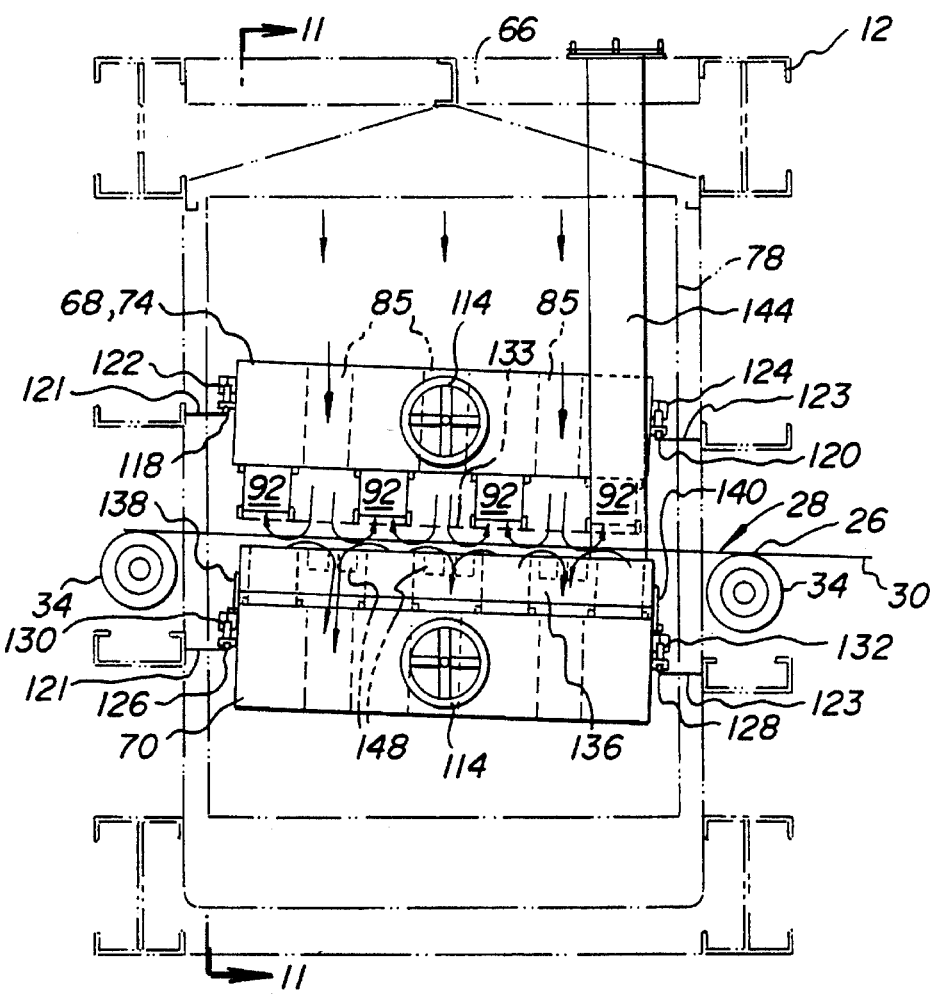
FIG. 10 shows a fragmentary sectional elevation view taken along line 10—10 of FIG. 2, looking through an access door at a portion of the upper span of the casting belt.
Figure 11:
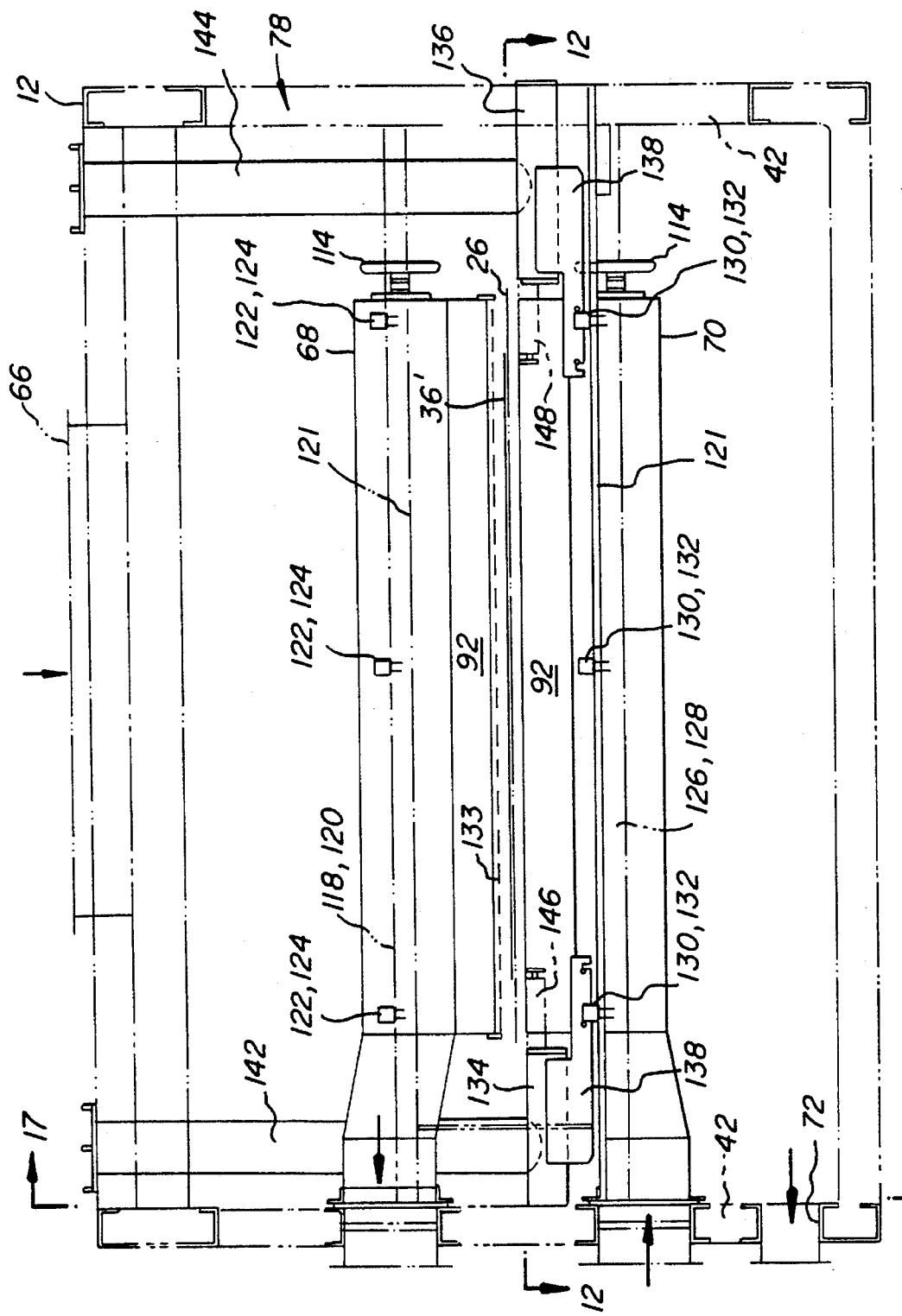
FIG. 11 shows a fragmentary sectional elevation view taken along lines 11—11 of FIG. 10 and 11—11 of FIG. 17, looking at a portion of the upper span of the casting belt.
Figure 12:
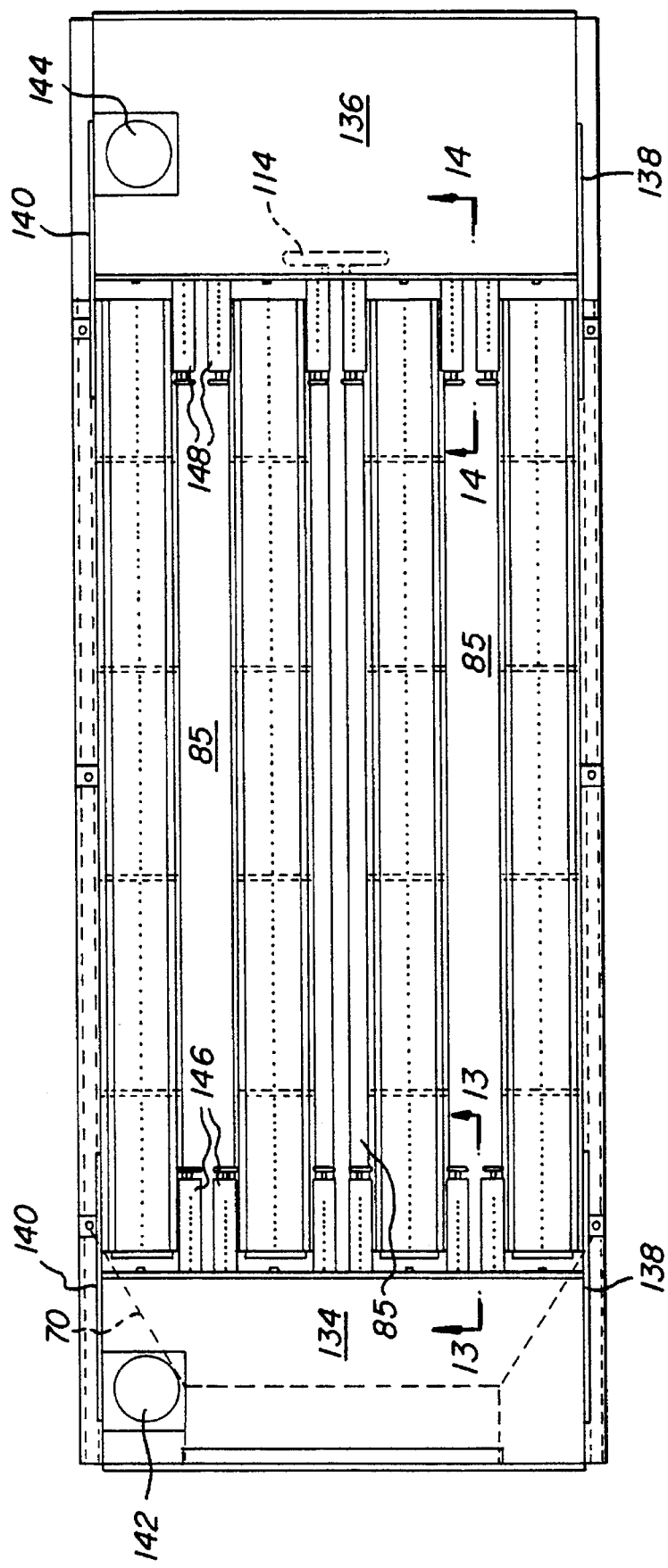
FIG. 12 shows a view taken along line 12—12 of FIG. 11.
Figure 17:
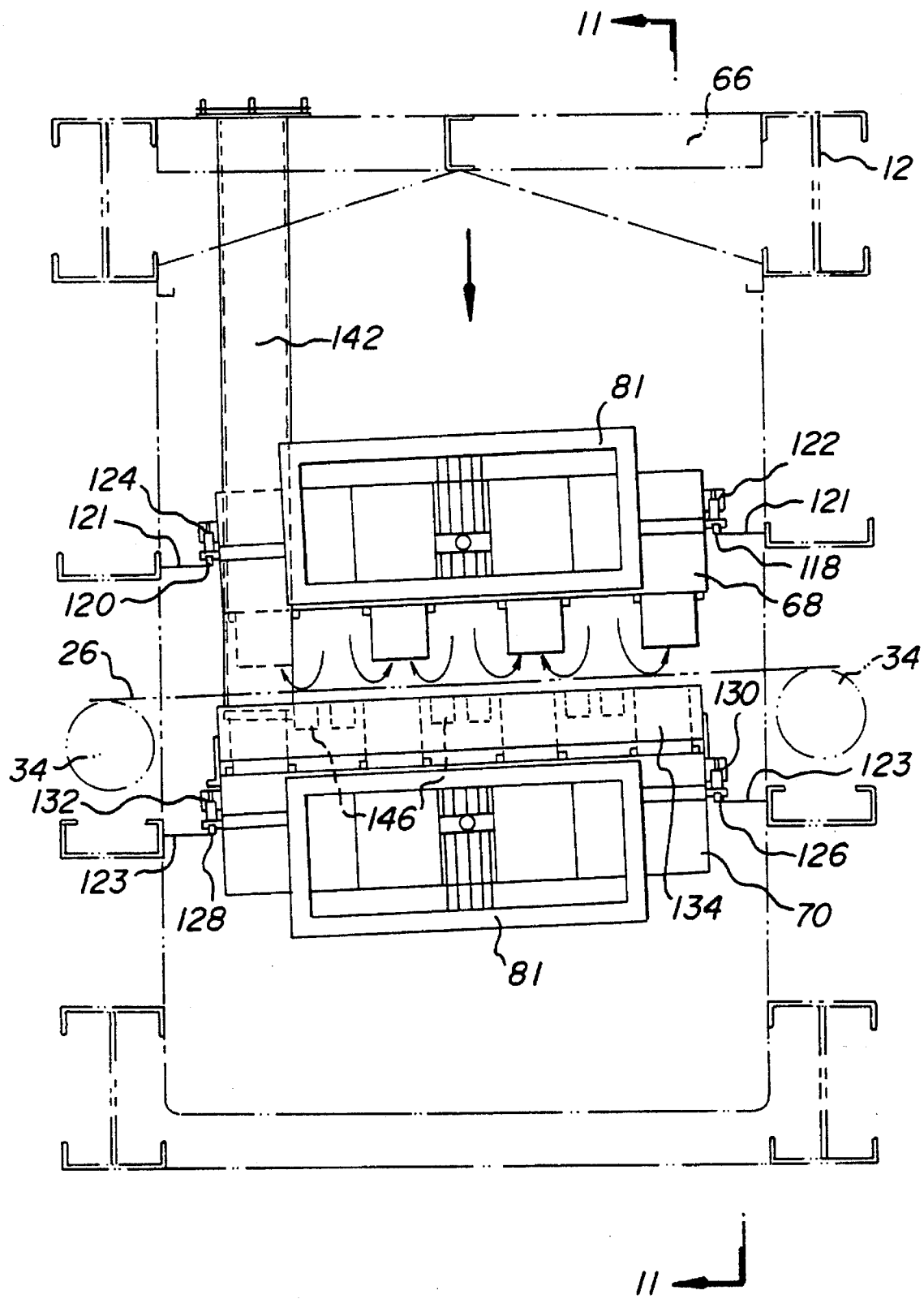
FIG. 17 shows a fragmentary sectional elevation view taken along line 17—17 of FIG. 11, looking at a portion of the upper span of the casting belt.

FIGS. 10, 11 and 17 show the flow paths for gas and gas with solvent vapor in compartments 46 to 52. As previously mentioned, at least compartment 46 is configured as shown in these Figures. Gas enters through inlet 66 and moves downwardly toward belt 26 and layer 36'. Inlet channels $85_i$ between ducts 84 direct the gas along flow paths substantially normal to casting belt 26 and layer 36'. In the preferred embodiment, baffles 121,123 block flow of gas from inlet 66 through the clearances between the plenums 68 and the walls of the compartment, to reduce any tendency for flow of gas transverse to the direction of movement of the belt; however, such baffles may be omitted without departing from the scope of the invention. As used in this specification, the expression "flow paths substantially nounal to the casting belt" means that the gas flows from channels $85_i$ of plenums 68 or openings 94 of plenums 74 or openings 116 of plenums 70, as the case may be, directly toward the outer surface of the belt and layer 36' or the inner surface of the belt, with little or no component of velocity transverse to the direction of movement of the belt; then flows along the belt either in or opposite to the direction of movement of the belt; and finally flows directly away from the belt, again with little or no transverse component of velocity, into openings 94 of plenums 68 or channels $85_o$ of plenums 74 and 70. To provide further assurance that the flow of gas through at least compartment 46 will not damage layer 36', a screen 133 may be suspended beneath flow guides 92, as shown schematically in FIGS. 10, 11, 13 and 14. Upon engagement with layer 36', the gas flows entrain evolved solvent. The mixture of gas and solvent vapor is then received into openings 94 in flow guides 92, from which the mixture is exhausted through duct 80. At the same time, on the other side of belt 26, gas enters through openings 116 and moves, in the sense just discussed, along flow paths substantially normal to belt 26 to engage and cool the belt. The gas then is directed along flow paths substantially normal to the belt and received into exhaust channels $85_o$, from which the gas passes out of the compartment through outlet 72.

Figure 18:
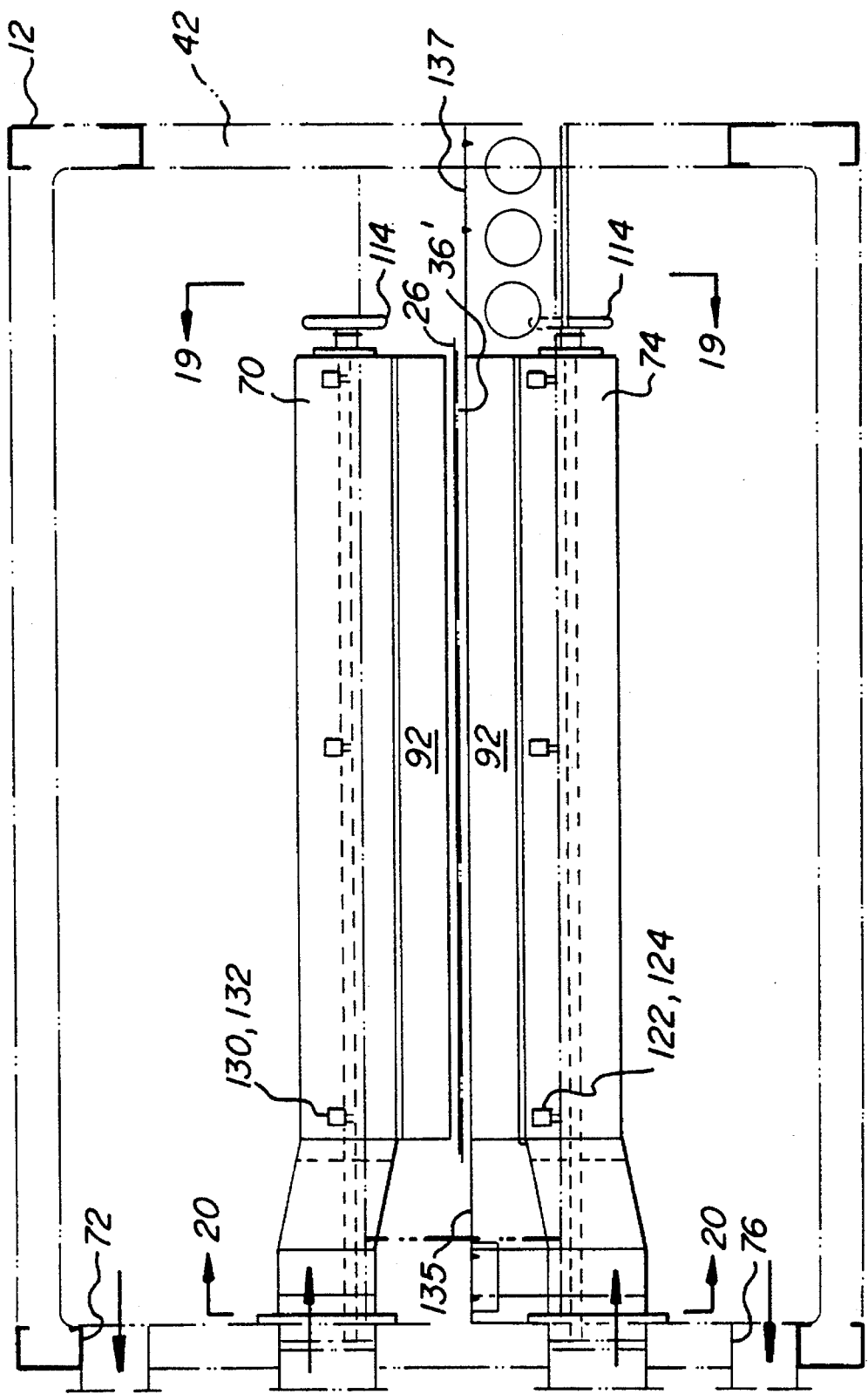
FIG. 18 shows an enlarged elevation sectional view of the lower half of FIG. 3, taken along line 18—18 of FIG. 2.

As shown in FIG. 11, layer 36' is significantly narrower than belt 26. As a result, there are exposed bands on outer surface 28 on either side of layer 36'. These bands are not subject to the evaporative cooling experienced by the central portion of the casting belt as the solvent is evaporated from layer 36'. So, the edges of the belt tend to be warmer than the center, which can cause a difference in the drying rate of layer 36' at the edges, which can lead to a tendency to edge curl upon removal from the belt. FIGS. 12 to 16 show the features of the present invention which, at least in compartment 46 and preferably also in compartments 48 to 52, cool the edges of the belt to minimize the temperature gradient across the belt and thus reduce the tendency of the layer to edge curl. A pair of edge cooler inlet boxes or plenums. 134, 136 are mounted across the ends of plenums 70 by means of a pair of brackets 138, 140, just below the level of belt 26. Plenums 136, 136 thus baffle flow of gas from one side of the belt to the other. As shown in FIG. 18, baffles 135, 137 are provided on the lower span of the belt at the ends of plenums 70. These baffles help to balance the flows of gas on either side of the belt but are not critical to operation in accordance with the invention. Inlet ducts 142, 144 extend downwardly within casing 42 to respective plenums 134, 136 to provide a flow of gas for cooling the edges of belt 26s Extending toward the center of plenum 70 from the sides of inlet plenums 134, 136 is an array of pairs of edge cooling nozzles 146, 148 which preferably extend between flow guides 92 into exhaust channels 85$_o$, as best seen in FIGS. 12 to 14. Each edge cooling nozzle comprises an outer, square nozzle tube 150 which opens into the interior of its associated inlet plenum 134 or 136 and extends beneath belt 26 to a distance somewhat longer than the maximum anticipated width of the exposed bands on the outer side 28 of belt 26. The inner end of each tube 150 is closed by an end plate 152 which is provided with a central bore to rotatably support a lead screw 154 which extends along the center of robe 150. Lead screw 154 is threaded through a tapped bore in an end plate 156 which doses one end of a square tube 158 telescopically positioned within robe 150. The opposite ends of robes 150, 158 open into the interior of their associated inlet box. Thus, rotation of a hand knob 160 on the exposed end of lead screw 154 will cause robe 158 to move within robe 150. Tube 150 is provided on its upper surface with a central row of holes 162 facing toward inner side 30 of belt 26, while robe 158 is provided on its upper surface with a central through slot, not visible in the Figures, which faces holes 162. This central slot preferably is about 2 inches (50.9 mm) long, to expose a corresponding width of the belt to a flow of cooling gas. Thus, by rotating hand knob 160 to adjust the position of robe 158, the transverse position of the central slot may be changed, thus enabling the operator to adjust the location of the edge cooled portion to correspond to the width of layer 36' on the opposite side of belt 26. Of course, the length of the central slot may be selected so that the edge cooled portions of the belt may be fully as wide as the exposed bands on the outer surface. Alternatively, if the edges of the casting belt were run between transversely movable baffles, not illustrated, which could be set at the very edges of layer 36', then the edges of the band could be cooled outboard of such baffles by arrays of nozzles extending along the edges of the belt.

Figure 20:
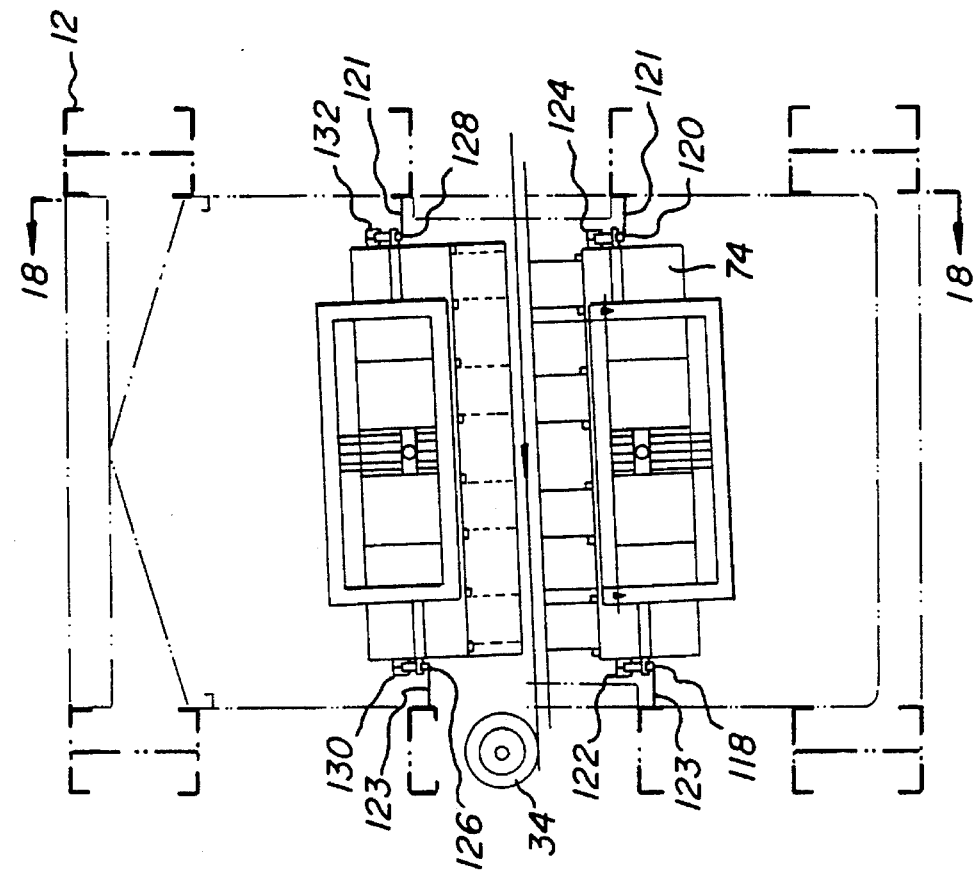
FIG. 20 shows an elevation view along line 20—20 of FIG. 18.
Figure 19:
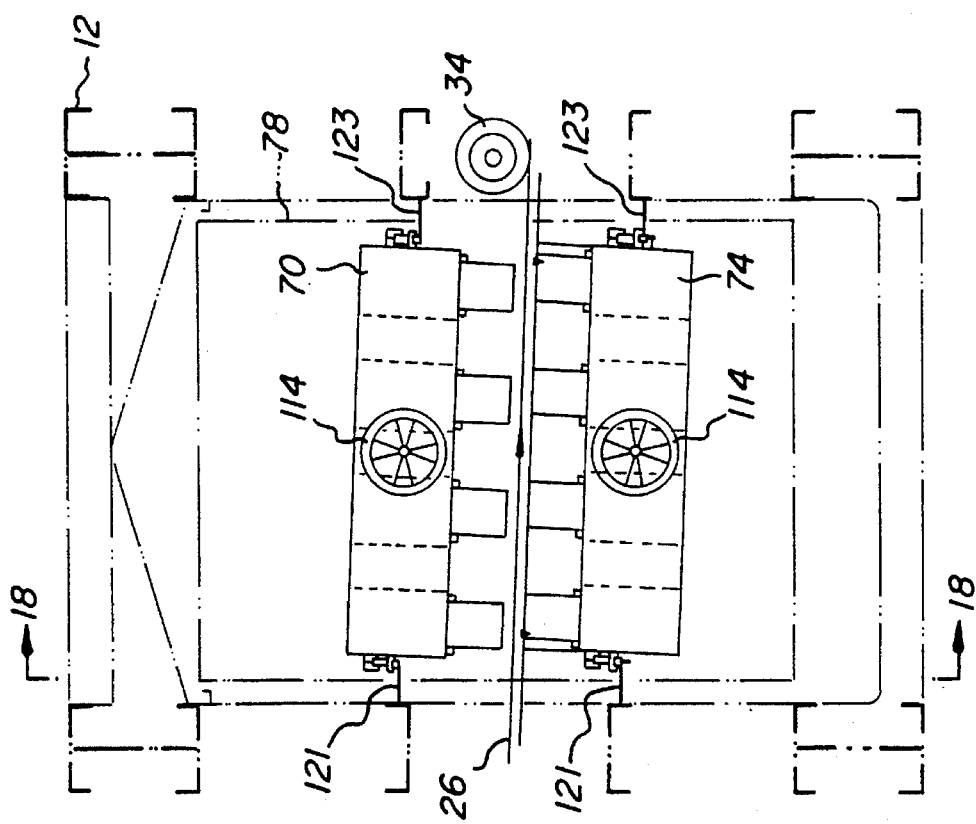
FIG. 19 shows an elevation view along line 19—19 of FIG. 18.

FIGS. 18 to 20 illustrate how plenums 70 and 74 are installed on either side of the lower span of belt 26 in compartments 56 to 62. As can be appreciated from the Figures, except for the absence of the edge cooling nozzles and their associated ducting, the arrangement in these Figures corresponds in all essential details to that of FIGS. 11, 10 and 17, respectively.

Figure 21:
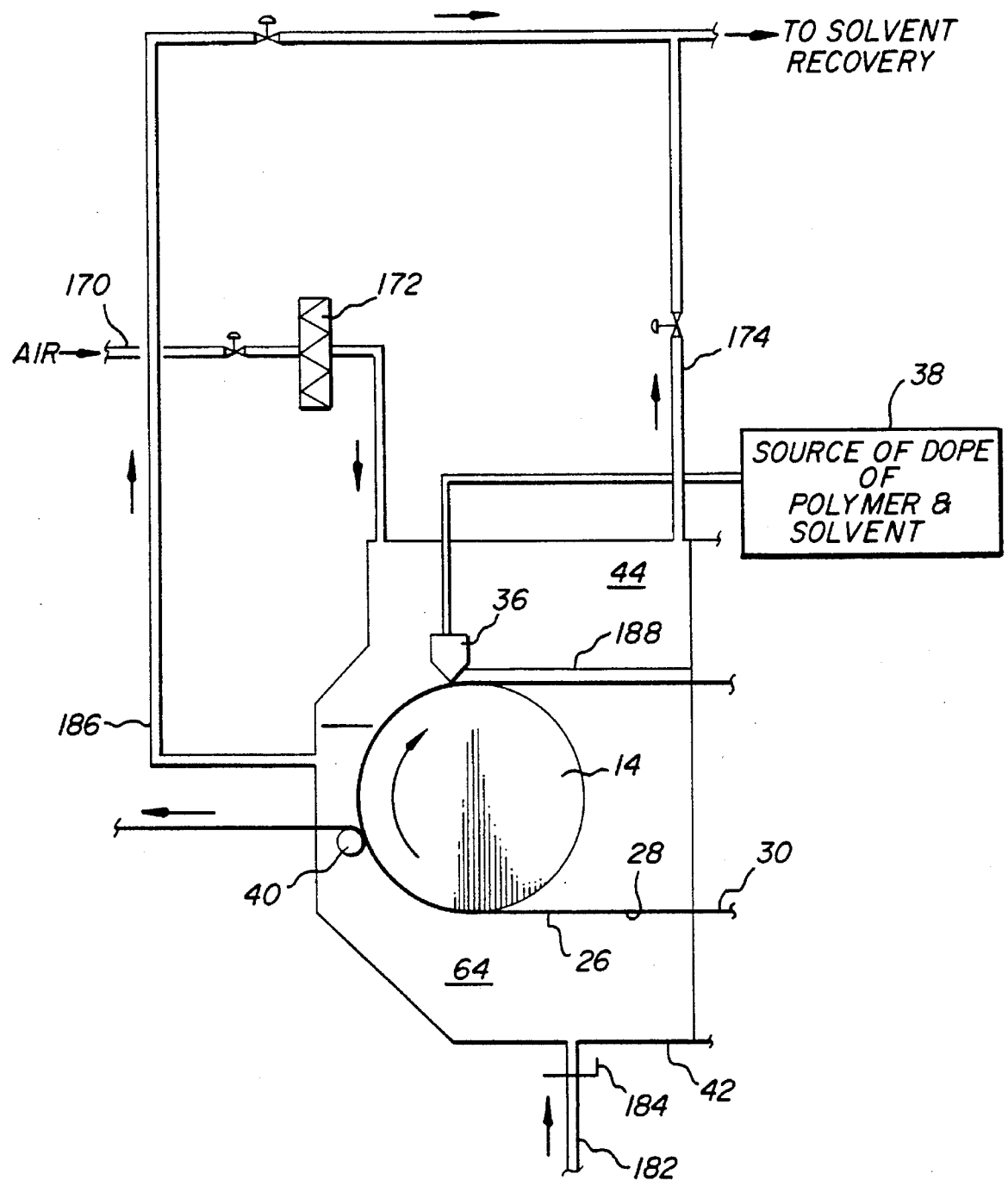
FIG. 21 shows a schematic diagram of the gas and solvent flow control system for the casting and stripping compartments of the apparatus.

FIGS. 21 to 23 illustrate schematically gas and solvent flow control systems for apparatus 10. In the conventional manner, gas flow into hopper compartment 44 comes from a solvent recovery system, not illustrated, over an inlet line 170, through a filter 172. The gas from the solvent recovery system may include a minor percentage of solvent, as previously mentioned. Gas and solvent vapor are withdrawn from compartment 44 over an outlet line 174 to the recovery system. Below hopper compartment 44, a gas inlet line 182 delivers gas to stripper compartment 64, past a conventional flow control damper 184. A gas outlet line 186 near stripper roller 40 removes gas and solvent vapor to the recovery system.

After layer 36' has been cast from hopper or die 36 onto belt 26, the belt and layer pass through a shallow casing 188 which closely confines layer 36' and minimizes escape of solvent vapors, thus providing a saturated environment in which the surface of the layer can settle before the layer enters compartment 46. As shown in FIGS. 22A and 22B, a fan 190 moves gas from the recovery system through a heater/cooler unit 192 where the gas temperature is adjusted as necessary for proper drying of layer 36'. Downstream of unit 192, the gas passes into parallel lines each having a suitable flow damper 194, through a high efficiency falter 196 and into compartments 46 to 52. Though a single heater/cooler unit 192 is illustrated, those skilled in the an will understand that additional cooler, heater/cooler or heater units may be provided to permit adjustment of the temperature for each individual compartment, if desired. After the gas has circulated through the compartments in the manner previously described, it is withdrawn from plenums 68 on parallel outlet lines 198 and passed to the recovery system. Some or all of the gas may be recirculated. Gas flow for end compartment 54 is provided by a fan 200 which passes gas from the recovery system through a heater 202, past flow damper 194 and filter 196 and into plenum 74 within the compartment. Gas flow from end compartment 54 is provided over line 204, as will be discussed further with reference to FIG. 23B.

On the opposite side and along the upper span of belt 26, a fan 206 passes gas from the recovery system through a pair of parallel heaters 208, past flow dampers 194 and filters 196 into plenums 70 in compartments 46 to 52. Those skilled in the art will understand that additional heaters may be provided to adjust the temperature for each compartment, as desired. After the gas has circulated through the compartments, it is withdrawn through outlets 72 and passed to the recovery system. Downstream of heaters 208, side streams of gas are passed over lines 210, 212 to coolers 216, 214 which pass cooled gas to inlet ducts 142, 144 for edge cooling nozzles 146, 148.

On the outer side of the lower span of belt 26, a fan 218 passes gas from the recovery system through a pair of parallel heaters 220, 222 which pass warmed gas to plenums 74 within compartments 62 and 60; and through a pair of parallel heaters 224, 226 which pass warmed gas to plenums 74 within compartments 58 and 56. Those skilled in the art will understand that additional heaters may be provided to adjust the temperature for each compartment, as desired. After the gas has circulated in the manner previously described, it is withdrawn from compartments 56 to 62 through outlets 76. In the lower part of end compartment 54, gas from fan 200 and heater 202 is passed to plenum 74. Gas and solvent vapor are then withdrawn from compartment 54 on line 204 and passed to the recovery system. Some or all of the gas may be recirculated.

On the inner side of the lower span of belt 26, a fan 228 passes gas from the recovery system through a heater/cooler 230 which passes gas to plenums 70 in compartments 62 and 60; and through a parallel heater 232 which passes air to plenums 70 in compartments 58 and 56. Though one pair of heater/cooler units 230, 232 is illustrated, those skilled in the art will understand that additional cooler, heater/cooler or heater units may be provided to permit adjustment of the temperature for each individual compartment, if desired. Gas and solvent vapor are then withdrawn from the compartments though outlets 72. Again, some or all of the gas may be recirculated.

In one actual embodiment of the gas flow control system just described, a layer 36' having a transverse width in the range previously mentioned was extruded using a dope comprising cellulose acetate and methylene chloride. The layer entered compartment 46 with a temperature in the range of 70° to 90° F. (21° to 32° C.) and moved through the apparatus at a speed in the range of 20 to 100 ft/min (6 to 30.5 m/min). The gas flow through inlets 66 was in the range of 500 to 1,500 ft$^3$/min. (14 to 42 m$^3$/min.) with temperatures in the range of 75° to 250° F. (24° to 121° C.). Although edge cooling nozzles were not used in this actual embodiment, the estimated gas flow through the edge cooling nozzles would be in the range of 25 to 75 ft$^3$/min (0.7 to 2.0 m$^3$/min) with temperatures in the range of 60° to 100° F. (16° to 38° C.). The gas flow through plenums 74 in compartment 54 on the upper and lower spans of belt 26 was in the range of 500 to 1,500 ft$^3$/min (14 to 42 m$^3$/min) with a temperature in the same range as at inlets 66. The gas flow through plenums 74 in compartments 56 to 62 on the lower span was in the range of 1,000 to 2,000 ft$^3$/min (14 to 42 m$^3$/min) with temperatures in the same range as at inlets 66. On the inside and along the upper and lower spans of belt 26, the gas flow through plenums 70 was in the range of 500 to 1,500 ft$^3$/min (14 to 42 m$^3$/min) with temperatures in the same range as at inlets 66. The layer exited compartment 64 with a solvent concentration in the range of 15 to 60% on a wet basis. Preferably, the concentration of solvent in the gas is maintained below the lower explosive limit.

While our invention has been shown and described with reference to particular embodiments thereof, those skilled in the art will understand that other variations in form and detail may be made without departing from the scope and spirit of our invention.

Having thus described our invention in sufficient detail to enable those skilled in the art to make and use it, we claim as new and desire to secure Letters Patent for:

1. In a method for producing a thin polymeric film, the method being of the type including steps of providing a source of a solution of polymer and solvent; providing an endless casting belt having a width, an outer surface for receiving a cast layer of polymer and solvent and an opposite, inner surface; advancing the endless belt while casting the layer of polymer and solvent onto the outer surface at a location along the casting belt, the layer having a transverse width somewhat narrower than the width of the casting belt; directing a flow of dryer gas to the layer to evaporate solvent; and removing gas and solvent from the vicinity of the casting belt, the improvement wherein the directing and removing steps comprise:

at first locations extended substantially across the width of the casting belt downstream of the first locations along the casting belt, directing flows of gas toward the outer surface of the casting belt to remove solvent evaporating from the cast layer of polymer and solvent, the first locations being spaced from each other along at least a first portion of the length of the outer surface; and at least at one, second location extended substantially across the width of the belt between the first locations, receiving flows of gas and solvent and directing the gas and solvent away from the layer along flow paths substantially normal to the outer surface.

2. The improvement of claim 1, wherein the flows of gas from the first locations are directed along flow paths substantially normal to the casting belt.

3. The improvement of claim 1, further comprising the steps of:

at third locations extended substantially across the width of the belt downstream of the location on the casting belt, directing flows of gas toward the inner surface of the casting belt to control the temperature of the casting belt, the third locations being spaced from each other along at least a portion of the length of the inner surface; and at least at one, fourth location extended substantially across the width of the belt between the third locations, receiving flows of gas and directing the gas away from the inner surface.

4. The improvement of claim 3, wherein the flows of gas from the first and third locations are directed along flow paths substantially normal to the casting belt.

5. The improvement of claim 3, wherein the flows of gas and solvent are directed away to the second and fourth locations along flow paths substantially normal to the inner surface.

6. The improvement of claim 1, wherein the casting belt is positioned within a casing, the casing being divided transversely into compartments along the length of the casting belt; and the improvement further comprises portions of the first locations being disposed within successive ones of the compartments.

7. The improvement of claim 1, wherein the casting belt is positioned within a casing, the casing being divided transversely into compartments along the length of the casting belt; and the improvement further comprises the steps of:

introducing a flow of gas into at least one first compartment downstream of the location along the casting belt but upstream of the first portion of the length of the outer surface;

at fifth locations extended substantially across the width of the casting belt within the at least one compartment and between the means for introducing and the casting belt, receiving flows of gas and solvent and directing the gas and solvent away from the layer; and at least at one, sixth location extended substantially across the width of the belt between the fifth locations, directing the flow of gas from the introducing step toward the outer surface of the casting belt to remove solvent evaporating from the layer.

8. The improvement of claim 7, wherein the flow of gas from the introducing step is directed along flow paths substantially normal to the casting belt.

9. The improvement of claim 8, wherein the flows of gas and solvent are directed away to the third locations along flow paths substantially normal to the casting belt.

10. The improvement of claim 1, wherein the casting belt is positioned within a casing, the casing being divided transversely into compartments along the length of the casting belt; and the improvement further comprises the steps of:

portions of the first and second locations being disposed within successive ones of the compartments;

at third locations extended substantially across the width of the belt downstream of the location along the casting belt, directing flows of gas toward the inner surface of the casting belt to control the temperature of the casting belt, the third locations being spaced from each other along at least a portion of the length of the inner surface;

at least at one, fourth location extended substantially across the width of the belt between the third locations, receiving flows of gas and directing the gas away from the inner surface;

introducing a flow of gas into at least one first compartment downstream of the location along the casting belt but upstream of the first portion of the length of the outer surface;

at fifth locations extended substantially across the width of the casting belt within the at least one compartment and between the point of introduction of the flow of gas and the casting belt, receiving flows of gas and solvent and directing the gas and solvent away from the layer; and at least at one, sixth location extended substantially across the width of the belt between the fifth locations, directing the flows of gas from the introducing step toward the outer surface of the casting belt to remove solvent evaporating from the layer.

11. The improvement of claim 10, wherein the flows of gas from the fast, second and sixth locations are directed along flow paths substantially normal to the casting belt.

12. The improvement of claim 11, wherein the flows of gas and solvent are directed away to the second and fifth locations along flow paths substantially normal to the casting belt.

13. The improvement of claim 1, further comprising a step of individually controlling gas flow rates and temperatures in the compartments along length of the casting belt.

14. The improvement of claim 1, further comprising the step of directing further flows of gas toward the longitudinal edges of the inner surface to cool further the longitudinal edges and reduce the tendency of the layer to edge curl upon removal from the casting belt.

* * * * *

UNITED STATES PATENT AND TRADEMARK OFFICE
CERTIFICATE OF CORRECTION

PATENT NO. : 5,553,835
DATED : September 10, 1996
INVENTOR(S) : Dresie et al.

It is certified that error appears in the above-indentified patent and that said Letters Patent is hereby corrected as shown below:

Column 15, Line 13 should read --gas from the first, second and sixth locations are directed--

Signed and Sealed this

Thirty-first Day of December, 1996

Attest:

BRUCE LEHMAN

*Attesting Officer*      *Commissioner of Patents and Trademarks*